(12) United States Patent
Guigues

(10) Patent No.: US 11,176,409 B2
(45) Date of Patent: Nov. 16, 2021

(54) DISTANCE-INDEPENDENT KEYPOINT DETECTION

(71) Applicant: Sony Depthsensing Solutions SA/NV, Brussels (BE)

(72) Inventor: Laurent Guigues, Brussels (BE)

(73) Assignee: Sony Depthsensing Solutions SA/NV, Brussels (BE)

(*) Notice: Subject to any disclaimer, the term of this patent is extended or adjusted under 35 U.S.C. 154(b) by 168 days.

(21) Appl. No.: 16/469,380

(22) PCT Filed: Dec. 20, 2016

(86) PCT No.: PCT/EP2016/081862
§ 371 (c)(1),
(2) Date: Jun. 13, 2019

(87) PCT Pub. No.: WO2018/113911
PCT Pub. Date: Jun. 28, 2018

(65) Prior Publication Data
US 2020/0019809 A1 Jan. 16, 2020

(51) Int. Cl.
*G06K 9/00* (2006.01)
*G06K 9/46* (2006.01)
(Continued)

(52) U.S. Cl.
CPC ....... *G06K 9/4671* (2013.01); *G06K 9/00355* (2013.01); *G06K 9/4614* (2013.01);
(Continued)

(58) Field of Classification Search
CPC ............. G06K 9/4671; G06K 9/00355; G06K 9/4614; G06K 9/52; G06K 9/56;
(Continued)

(56) References Cited

U.S. PATENT DOCUMENTS

| | | | |
|---|---|---|---|
| 6,711,293 B1 * | 3/2004 | Lowe ................... | G06K 9/4671 382/219 |
| 2008/0013784 A1 * | 1/2008 | Takeshima ........... | G06K 9/6226 382/100 |

(Continued)

OTHER PUBLICATIONS

Mahmud et al., Hand Gesture Recognition Using SIFT Features on Depth Image, Ninth International Conference on Advances in Computer-Human Interactions. ACHI 2016. p. 359-365. ISBN: 978-1-61208-468-8 (Year: 2016).*

(Continued)

*Primary Examiner* — Van D Huynh
(74) *Attorney, Agent, or Firm* — Wolf, Greenfield & Sacks, P.C.

(57) ABSTRACT

Described herein is a method for detecting keypoints in three-dimensional images in which a three-dimensional image of a scene captured by a depth sensing imaging system is processed using a distance-independent keypoint filter. Keypoints are derived from the three-dimensional image by determining a mean shift field and using x- and y-components of the mean shift field to derive intersections of 0-isolines thereof. Positive and negative keypoints or nodes are connected to one another, positive to positive and negative to negative, to form a keygraph structure.

18 Claims, 13 Drawing Sheets

(51) Int. Cl.
    *G06K 9/52* (2006.01)
    *G06K 9/56* (2006.01)
    *G06K 9/62* (2006.01)
(52) U.S. Cl.
    CPC .............. *G06K 9/52* (2013.01); *G06K 9/56* (2013.01); *G06K 9/6212* (2013.01); *G06K 2009/4666* (2013.01); *G06T 2207/10028* (2013.01)
(58) Field of Classification Search
    CPC ......... G06K 9/6212; G06K 2009/4666; G06K 9/00389; G06T 2207/10028
    USPC ....................................................... 382/190
    See application file for complete search history.

(56) References Cited

U.S. PATENT DOCUMENTS

| | | | |
|---|---|---|---|
| 2009/0238460 | A1 | 9/2009 | Funayama et al. |
| 2013/0266210 | A1* | 10/2013 | Morgan-Mar .......... G06T 7/571 382/154 |
| 2015/0117708 | A1* | 4/2015 | Guigues ................. G06T 7/246 382/103 |
| 2018/0084240 | A1* | 3/2018 | Campbell ............ H04N 13/254 |
| 2018/0295340 | A1* | 10/2018 | Varekamp ............ H04N 13/128 |

OTHER PUBLICATIONS

Comaniciu et al., Mean Shift: A Robust approach toward feature space analysis. IEEE Transactions on Pattern Analysis and Machine Intelligence. IEEE Computer Society, 2002;5(24):603-619. DOI: 10.1109/34.1000236. (Year: 2002).*

International Search Report and Written Opinion for International Application No. PCT/EP2016/081862 dated Aug. 17, 2017.

Adelson et al., Pyramid methods in image processing. RCA Engineer 29.6. 1984:33-41.

Agarwal et al., CenSurE: Center Surround Extremas for Realtime Feature Detection and Matching. Lecture Notes in Computer Science. 2008;5305:102-115.

Comaniciu et al., Mean Shift; A Robust approach toward feature space analysis. IEEE Transactions on Pattern Analysis and Machine Intelligence. IEEE Computer Society, 2002;5(24):603-619. DOI: 10.1109/34.1000236.

Ebrahimi et al., SUSurE: Speeded Up Surround Extrema Feature Detector and Descriptor for Realtime Applications. Computer Vision and Pattern Recognition Workshops. IEEE 2009. 6 pages.

Fukunaga et al., The Estimation of the Gradient of a Density Function, with Applications in Pattern Recognition. IEEE Transactions on Information Theory, 1975;21(1):32-40. DOI: 10.1109/TIT.1975.1055330.

Guigues et al., Scale-sets image analysis. International Journal of Computer Vision. 2006;68(3):289-317. DOI: 10.1007/s11263-005-6299-0.

Jakkula, Efficient feature detection using OBAloG: optimized box approximation of Laplacian of Gaussian. Thesis for degree of Master of Science. Kansas State University, Manhattan, Kansas. 2010. 73 pages.

Lindeberg, Scale-space theory in computer vision. Royal Institute of Technology. Stockholm, Sweden. Kluwer Academic Publishers. Boston/London/Dordrecht. 1993. 69 pages.

Lowe, Distinctive image features from scale-invariant keypoints. Accepted for publication in International Journal of Computer Vision, 2004. 28 pages.

Mahmud et al., Hand Gesture Recognition Using SIFT Features on Depth Image. Ninth International Conference on Advances in Computer-Human Interactions. ACHI 2016. p. 359-365. ISBN: 978-1-61208-468-8.

Mallat, A Wavelet Tour of Signal Processing. Academic Press. Oct. 9, 2008. 123 pages.

Maple, Geometric design and space planning using the marching squares and marching cube algorithms. Proceedings of the 2003 International Conference on Geometric Modeling and Graphics. IEEE Computer Society. 2003. 6 pages.

Marr et al., Theory of Edge Detection, Proceedings of the Royal Society of London. Series B, Biological Sciences. 1980;207:187-217.

Yi et al., Three-dimensional object recognition via integral imaging and scale invariant feature transform. Proc. of SPIE vol. 9117. 2014. 6 pages. DOI: 10.1117/12.2048766.

* cited by examiner

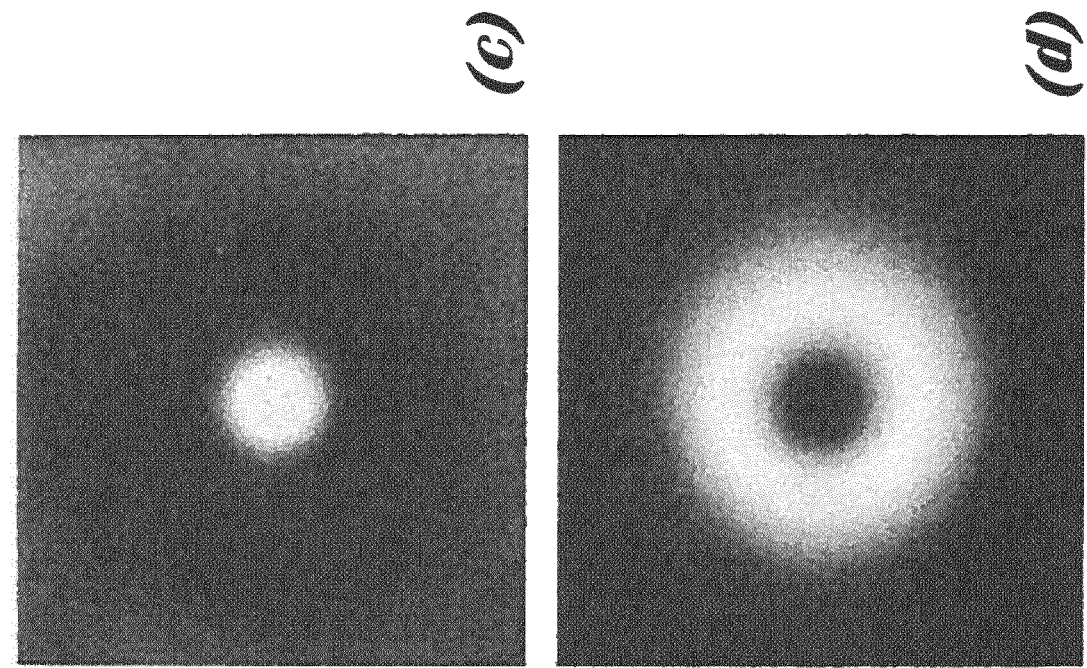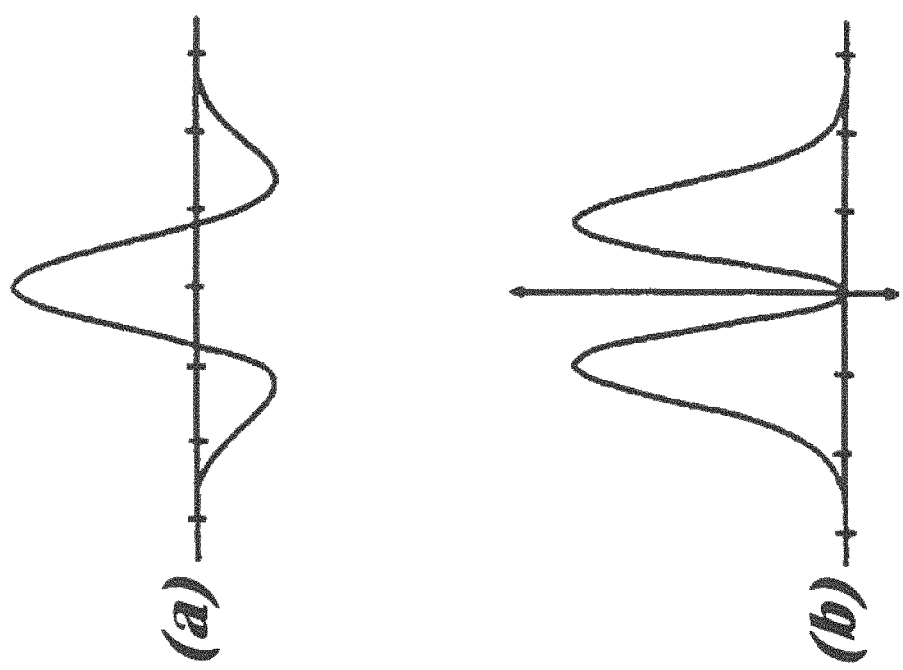
Fig. 1 Prior art

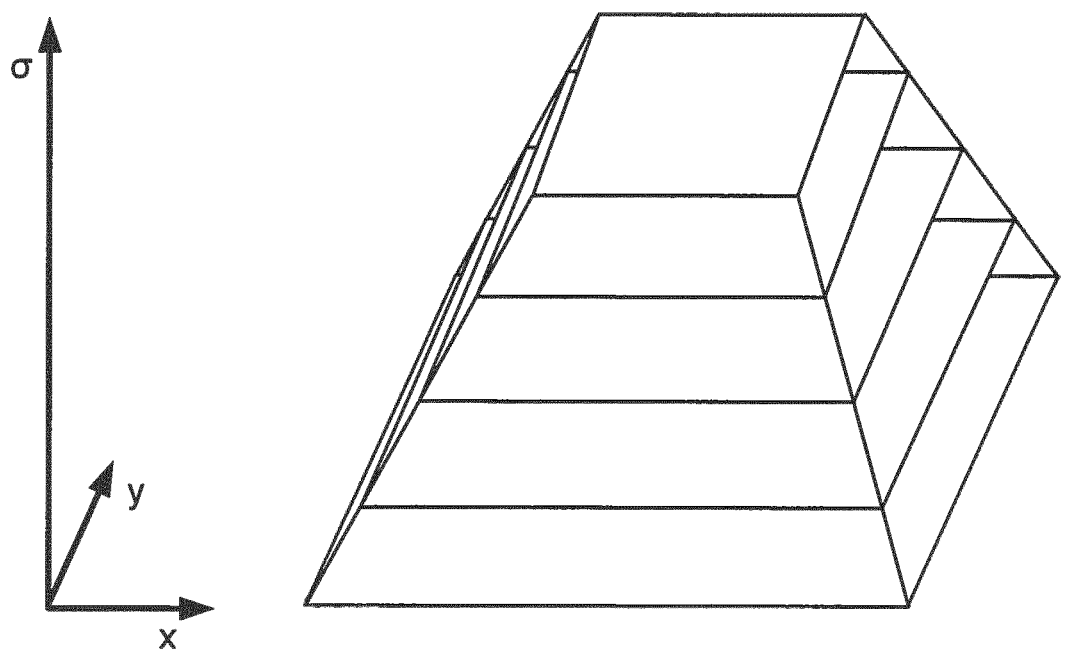
Fig. 2 *Prior art*
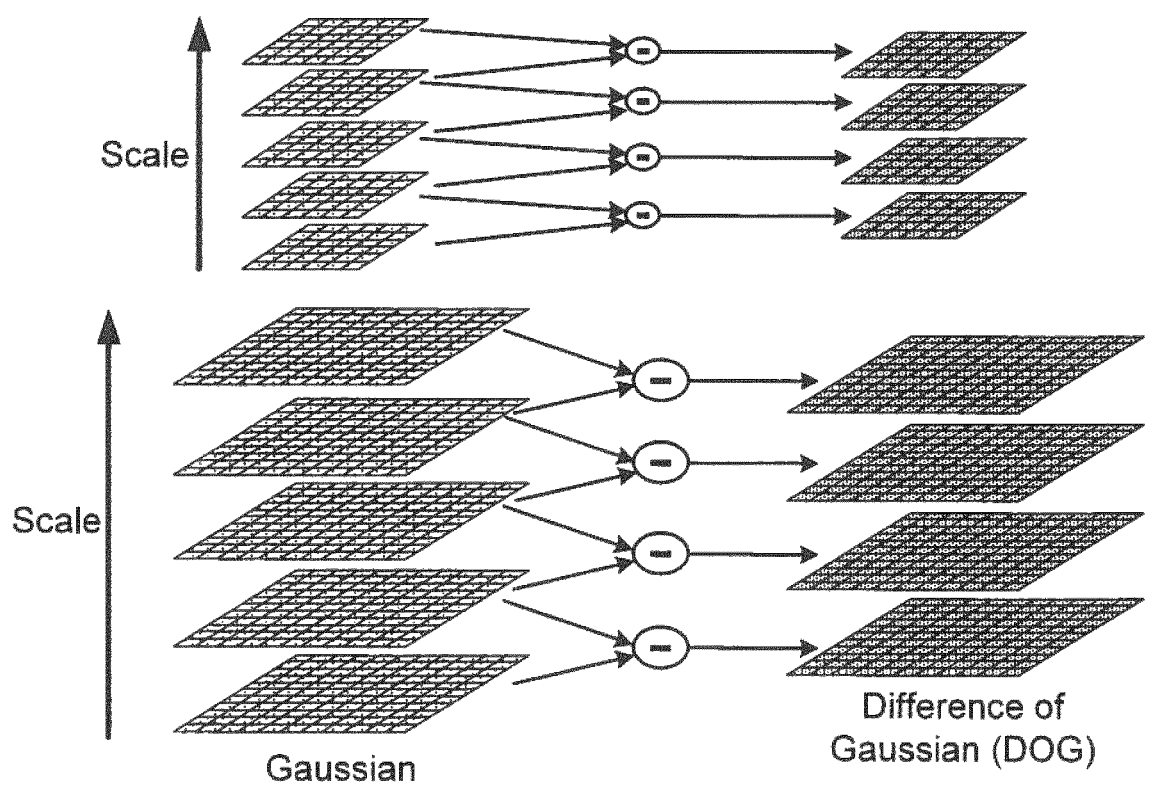
Gaussian   Difference of Gaussian (DOG)
Fig. 3 *Prior art*

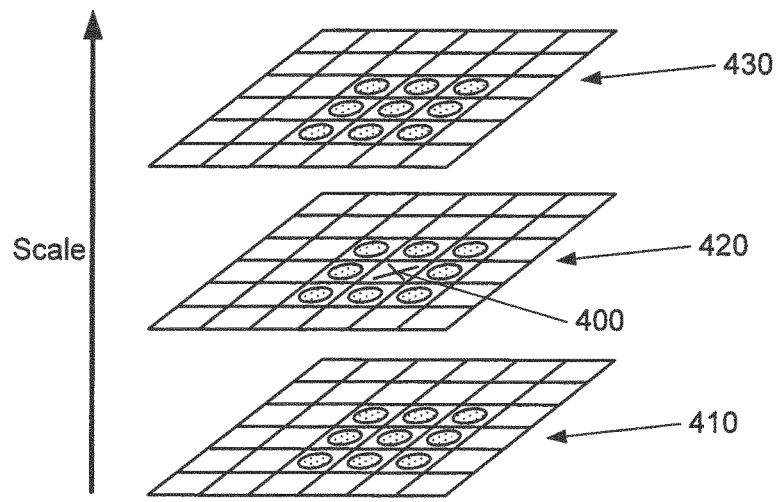
Fig. 4 *Prior art*
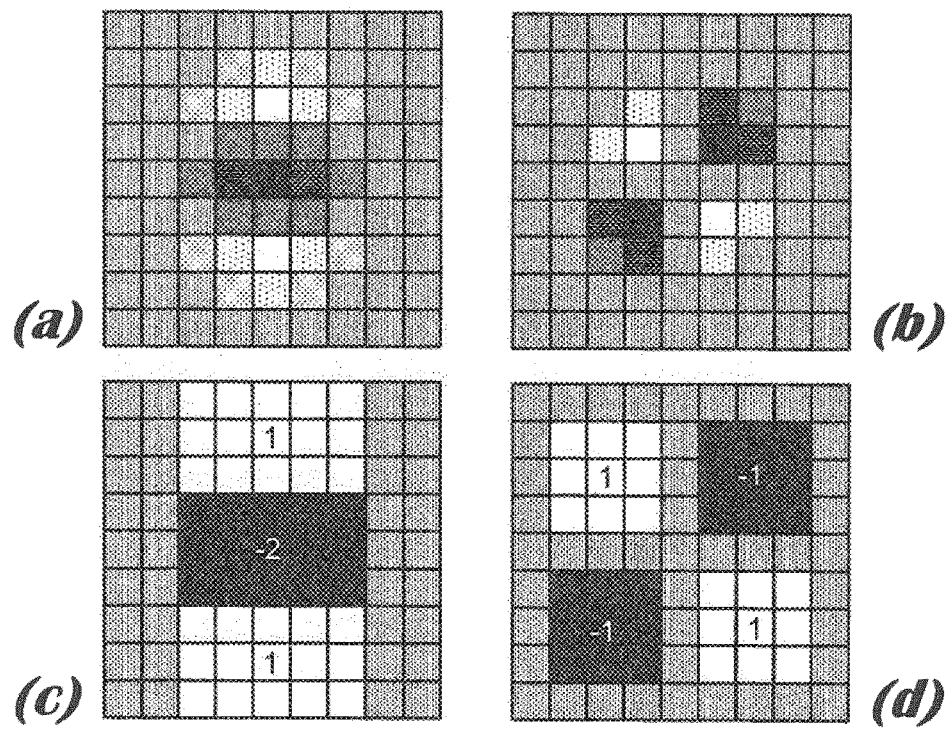
Fig. 5 *Prior art*

DISTANCE-INDEPENDENT KEYPOINT DETECTION

CROSS REFERENCE TO RELATED APPLICATIONS

The present application claims priority under 35 U.S.C. § 371 to International Patent Application PCT/EP2016/081862 filed on Dec. 20, 2016, the entire contents of which is incorporated herein by reference.

FIELD OF THE DISCLOSURE

The present disclosure relates to distance-independent keypoint detection, and, is more particularly concerned with the detection of keypoints in three-dimensional images.

BACKGROUND TO THE DISCLOSURE

In a usual image taken by a standard camera, the apparent size of an object changes with respect to its distance to the camera sensor due to inherent perspective projection involved in the image acquisition process. In order address the fact that the distance and thus the apparent size (or scale) of an object is a priori unknown in an arbitrary image, image analysis and computer vision tasks have to be designed to extract information at multiple scales, and, this multiscale information has to be actively searched to find the objects of interest. Furthermore, acquiring multiple perspective views of the same scene does not solve the scale problem as three-dimensional reconstructions obtained from multi-view reconstruction methods are determined based on scale factors.

Multiscale methods have been used for various image processing tasks, such as, filtering (image pyramids as disclosed in the article entitled "*Pyramid methods in image processing*" by ADELSON Edward H. et al., RCA engineer 29.6 (1984): pages 33 to 41; scale-space theory as disclosed in the article entitled "*Scale-space theory in computer vision*" by LINDEBERG, T., Vol. 256, Springer Science & Business Media, 2013), compression (wavelets as disclosed in the article entitled "*A wavelet tour of signal processing*" by MALLAT, S., Academic Press, 2008), segmentation (scale-sets as disclosed in the article entitled "*Scale-sets Image Analysis*" by GUIGUES, L. et al., Int. Journal of Computer Vision, July 2006, Vol. 68, Issue 3, pages 289 to 317), and keypoint extraction and matching (scale-invariant feature transform (SIFT) as disclosed in the article entitled "*Distinctive image features from scale-invariant keypoints*" by LOWE, David G., International journal of computer vision 60.2 (2004): pages 91 to 110 (hereinafter referred to as Lowe), and, speeded-up robust features (SURF) as disclosed in US-A-2009/0238460) because the scale ambiguity is a fundamental problem of perspective image analysis.

Many areas of computer vision systems require the detection of keypoints. A keypoint, which is referred to in the literature as an interest point, such as a blob, corresponds to a local feature of interest in an image, and, may correspond to a spatial location, or a point in the image which defines interesting features or prominent features in the image. Keypoints are special because no matter how the image changes, that is, whether the image rotates, shrinks or is subject to distortion, the same keypoints are detectable in the image.

Keypoint detection is a critical step in different image processing techniques, such as, object recognition and tracking, image registration, panoramic image creation, visual odometry, simultaneous localization, mapping, etc. Point matching between different views of a three dimensional (3D) scene, for example, when there is relative motion between an imaging system and the scene, such as, tracking a moving object within the scene, requires the recognition of identical keypoints in images acquired with different angles. Keypoints will therefore be seen with a different scale and a different orientation in different images with respect to time. The apparent size of a keypoint associated with an object in an image also varies depending on the distance of the object from an imaging system, for example, a camera.

Existing keypoint detection methods use various operators applied to the input images. All these methods use a multiscale approach because the apparent size of an object is a priori unknown in a visual domain image as it depends on the distance of the object from the imaging sensor of the camera.

Most of the time, the real size of the objects, which are to be detected in an image of a scene, is known since a user is interested in the detection of a particular object. What is unknown is the size of the object within the image itself, or the apparent size of the object, since it varies with the distance of the object to the camera.

SUMMARY OF THE DISCLOSURE

It is therefore an object of the present disclosure to provide a method of distance-independent keypoint detection within a three-dimensional image.

In accordance with one aspect of the present disclosure, there is provided a method in accordance with claim 1.

In accordance with another aspect of the present disclosure, there is provided an image processing system in accordance with claim 16.

In accordance with a further aspect of the present disclosure, there is provided a non-transitory computer-readable data storage medium in accordance with claim 18.

BRIEF DESCRIPTION OF THE DRAWINGS

For a better understanding of the present disclosure, reference will now be made, by way of example only, to the accompanying drawings in which:—

FIG. 1a shows the second derivative of the one-dimensional Gaussian distribution;

FIG. 1b shows the Fourier transform of FIG. 1a;

FIG. 1c shows the Laplacian of the Gaussian in two dimensions;

FIG. 1d shows the Fourier transform of FIG. 1c;

FIG. 2 illustrates a schematic representation of the scale space pyramid;

FIG. 3 illustrates the scale space representation used for a conventional Difference of Gaussian method;

FIG. 4 illustrates a conventional characterization of pixels of a keypoint;

FIGS. 5a and 5b illustrate second order partial derivatives of a Gaussian distribution for a SURF filter;

FIGS. 5c and 5d are approximations of the second order partial derivatives shown in FIGS. 5a and 5b respectively;

DESCRIPTION OF THE DISCLOSURE

Figure 6:
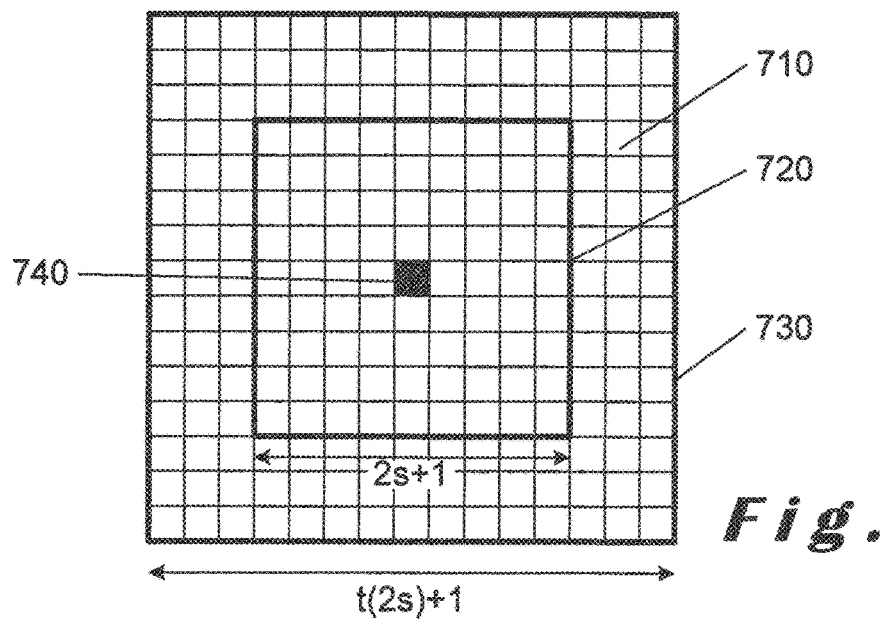
FIG. 6 illustrates a box type filter used in an embodiment of the present disclosure.

The present disclosure will be described with respect to particular embodiments and with reference to certain drawings but the disclosure is not limited thereto. The drawings described are only schematic and are non-limiting. In the drawings, the size of some of the elements may be exaggerated and not drawn on scale for illustrative purposes.

By the term "computer-readable data storage medium" is meant any computer-readable support containing digital data, including, but not restricted to, a solid state memory such as a random access memory, a flash memory, or a read-only memory, but also a magnetic data storage medium such as a hard disk drive or a magnetic tape, an optical data storage medium such as an optical disk, etc.

The terms "object" or "object of interest" as used herein refer to any feature in the real world which is to be detected by the 3D imaging system (or 3D camera) 3 and processed by the computer system 2 using the method according to the present disclosure. For example, the object can be a hand, a head, fingers, a device, a toy, etc.

The term "keypoint" as used herein refers to at least one pixel corresponding to a feature in an image which itself corresponds to a feature in the real world. The terms "object" and "object of interest" in the real world are linked with the term "keypoint" in an image or virtual world (or virtual environment).

The availability of depth imaging sensors fundamentally changes the problem, because, as soon as one knows the distance of a pixel and intrinsic parameters the sensor, it is possible to compute the actual physical size of the element of surface that has been imaged by this pixel, or conversely, compute the apparent size in pixels of a surface patch of given physical size. Image operators can then be designed to extract information related to an absolute physical size rather than related to a scale relative to the apparent size of objects in the image.

In scale-space theory as proposed by Lindeberg above, rescaling an image corresponds to applying a scaling operator to the image. Linear scale-spaces are obtained by convolving the image by a low pass filter, typically, a Gaussian filter, whose standard deviation (in pixels) is tuned to the desired scale relative to the initial image resolution. Such a filter averages image values in a window of half size s centered at each pixel. In n dimensions, the filter is defined as a separable filter whose kernel is the product of n one-dimensional identical kernels.

For the sake of simplicity, for two-dimensional images, and for 'ideal' images defined on a continuous domain C, where $$C=[0,w]\times[0,h]$$

where w is the width and h is the height of a rectangle of $\mathbb{R}^2$. A mono-channel image I on C is represented by a function $$I:C\to\mathbb{R}$$

The sum of the image I over a window of half width s centered at pixel (x, y), W, is then:

$$W(I,x,y,s)=\iint_{x-s,y-s}^{x+s,y+s}I(u,v)dudv$$

and the corresponding flat kernel filter response, F, is given by:

$$F(I, x, y, s) = \frac{1}{4s^2} W(I, x, y, s)$$

If, in addition to image I, a distance image D, which gives for each pixel (x, y), the (average) distance (in metres) of the surface image by the pixel (x, y), and if these two images are aligned, that is, each pixel at location (x, y) in distance image D corresponds to the same pixel at the same location in image I, these two images can be considered as a single image with 2 channels, and that the characteristics of the imaging system(s) used to acquire these two channels are the same.

For a simple pinhole camera model, image geometrical distortions induced by the optical system used to acquire the image can be inverted and the image undistorted in a pre-processing step. This leads to an imaging system that can be modeled as a pinhole camera having a focal length, f, (in pixels).

For a physical surface element of half width r (in metres) imaged by the system at a distance d>0 of the optical center (in metres) assumed to be parallel to the sensor plane (fronto-parallel hypothesis), then its apparent half width, a, in the image (in pixels) is given by:

$$a = \frac{fr}{d}$$

For a physical size of interest r, a locally scaled image, L, can be defined in which the scale parameter is adjusted independently for each pixel of the image in order to match the target physical scale r as follows:

$$L_r(x, y) = F\left(I, x, y, \frac{fr}{D(x, y)}\right)$$

This corresponds to defining a position-adaptive resampling filter in which the sampling window size is locally adjusted to match the local apparent size of an object of size r in the physical world. Such an image may be described as the distance independent filtered image (DI) of image I using distance image D.

It is well-known that the sum, $S_I(R)$, of an image I over a rectangle $R=[x_0, x_1]\times[y_0, y_1]$ of C can be expressed by the mean of the integral image $S_I$ of I by:

$$S_I(R)=S_I(x_0,y_0)+S_I(x_1,y_1)-S_I(x_0,y_1)-S_I(x_1,y_0)$$

where $$S_I(x,y)=\iint_{0,0}^{x,y} I(u,v)\,du\,dv$$

Hence $$L_r(x, y) = \frac{1}{4s^2}\left[\begin{array}{c} S_I(x-s, y-s) + S_I(x+s, y+s) - S_I(x-s, y+s) \\ -S_I(x+s, y-s) \end{array}\right]$$

$$\text{with } s = \frac{fr}{D(x, y)}$$

This means that the local resampling at any pixel can be computed in constant time, independently of the size of the local resampling window. Two components need to be computed, namely, the integral image of the input image and the local window scale. The final filter response is then obtained by locally picking 4 values at the correct offsets in the integral image and adding or subtracting these values.

For the transposition of this process to digital (discrete) images, for a digital image I of size w×h defined on the discrete grid $G=\{0, \ldots, w-1\}\times(0, h-1)$, the discrete integral image of this image is then defined by:

$$DS_I(i, j) = \sum_{k=0}^{w-1}\sum_{l=0}^{h-1} I(k, l)$$

and the sum over a discrete window of half width s centered at (i, j) is then obtained by:

$$DS_I(i,j,s)=DS_I(i-s-1,j-s-1)+DS_I(i,s,j+s)-DS_I(i-s-1,j+s)-DS_I(i+s,j-s-1)$$

the surface of the window being $(2s+1)^2$.

A discrete version of the distance independent filter can thus be defined by simply rounding the values of the local apparent scales s to the nearest integer, leading to the result:

$$DL_r(i, j) = \frac{1}{(2s+1)^2}\left[\begin{array}{c} DS_I(i-s-1, j-s-1) + DS_I(i+s, j+s) \\ -DS_I(i-s-1, j+s) - DS_I(i+s, j-s-1) \end{array}\right]$$

$$\text{with } s = \left\lfloor \frac{fr}{D(x, y)} + 0.5 \right\rfloor$$

A subpixel accuracy filter can also be defined by considering bilinear interpolation. Given a digital image I, let $\bar{I}$ be the continuous image obtained by bilinear interpolation of I. The discrete distance independent (DI) filtering of image I can be defined as the continuous DI filtering of image $\bar{I}$, followed by discrete sampling on the digital grid G. As the integration and bilinear interpolation operators are both linear operators, they commute, which means that the subpixel accuracy DI filter value at a pixel can be computed using bilinear interpolation of the discrete integral image. Hence:

$$DL_r^{sub}(x, y) = \frac{1}{4s^2}\left[\begin{array}{c} \overline{DS_I}(x-s, y-s) + \overline{DS_I}(x+s, y+s) - \overline{DS_I}(x-s, y+s) \\ -\overline{DS_I}(x+s, y-s) \end{array}\right]$$

$$\text{with } s = \frac{fr}{D(x, y)}$$

This equation can also be evaluated at any subpixel position (x, y) using the interpolation $\bar{D}$ of the distance image.

Local adaptive rescaling of an image to obtain pixel values that match a predefined physical scale can be performed corresponding to locally smoothing the image by averaging over a window whose size matches an actual object size in the physical world. This can be viewed as simulating an orthogonal projection system in terms of light integration, whilst still getting measurements on the initial acquisition grid having a perspective projection geometry. Hence, the shapes of objects (and their apparent size) are not changed in the filtered image, but the image values are integrated over surfaces of approximately constant size in the physical world.

Naturally, there are distance independent operators other than scaling which rely on the definition of neighborhoods. The most basic image operators are based on local kernel operations, for example, the horizontal derivative at a given pixel of an image can be defined by the difference between the value of its right neighbor and its own value.

Whilst performing such operations on the DI filtered image is possible:

1. The distances between pixels in a neighborhood would not correspond to physical distances; and
2. Neighboring pixels may have different scales if they are not at the same distance hence providing inconsistent results.

By defining a neighborhood of a pixel at its own scale, it is possible to end disjointed neighborhood systems for neighboring pixels.

For a given pixel (i, j) of local scale:

$$s = \frac{fr}{D(i, j)}$$

the value of its neighbor, N, at offset (k, l) as the DI value obtained by averaging the image I on a window of half size s centered at position (i+2sk, j+2sl):

$$NDL_r(i, j, k, l) = DL_r(i + 2sk, j + 2sl)$$

with:

$$s = \left\lfloor \frac{fr}{D(i, j)} + 0.5 \right\rfloor$$

For example, the DI right-hand neighbor of a pixel is located at (k, l)=(1, 0) and its value is obtained by averaging over a window of the same size as the size of the central pixel window, shifted on the right. Similar equations can be derived for the DI left-hand neighbor of a pixel located at (k, l)=(−1, 0) where the '+' signs are replaced with '−' signs. The overall neighborhood of a pixel is a subsampled image at fixed scale, that is, the scale of the pixel centered on the pixel. (Naturally, $NDL_r(i, j, 0,0)=DL_r(i, j)$.) This can readily be applied to continuous or subpixel accuracy DI filters.

It is now easy to define the DI response of any kernel-based filter, where the kernel K is defined on a domain E, by:

$$DL_r^K(i, j) = \sum_{(k,l) \in E} K(k, l) NDL_r(i, j, k, l)$$

As described in the article entitled "*Theory of Edge Detection*" by MARR, D and HILDRETH, E., Proceedings of the Royal Society of London. Series B, Biological Sciences, Vol. 207, No. 1167, (Feb. 29, 1980), pages 187 to 217, (referred to hereinafter as Marr et al.), the optimal smoothing filter is based on the famous Gaussian operator, whose expression, in one dimension, is given by:

$$G(x) = [1/\sigma(2\pi)^{1/2}] \exp\left(-\frac{x^2}{\sigma^2}\right)$$

The standard deviation $\sigma^2$ of the Gaussian determines the scale of the keypoints which are maintained in the filtered image, whereas the keypoints whose scales are smaller than $\sigma^2$ are blurred.

On the other hand, intensity variations in an image appear as zero crossings in the second directional derivative of the image. The second directional derivative of an image is equivalent to applying a Laplacian operator to an image.

The Laplacian operator is usually applied to an image I which has first been smoothed with the Gaussian operator described above. The output image O obtained has the following expression:

$$O(x,y) = \nabla^2(G(x,y,\sigma)*I(x,y))$$

However, the derivative rule for convolutions implies that the previous expression is equivalent to:

$$O(x,y) = \nabla^2 G(x,y,\sigma)*I(x,y)$$

The combination of these two operators, the Laplacian and the Gaussian, results in the Laplacian of Gaussian or Log operator, also described in Marr et al.:

$$O(x,y) = LoG(x,y,\sigma)*I(x,y)$$

The LoG operator has the following mathematical expression:

$$LoG(x,y,\sigma) = \nabla^2 G(x,y,\sigma)$$

FIG. 1*a* illustrates the one-dimensional second derivative of the Gaussian distribution and FIG. 1*b* illustrates $\nabla^2 G(x, y, \sigma)$. FIGS. 1*c* and 1*d* are Fourier transforms of FIGS. 1*a* and 1*b* respectively. The Fourier transform shows that the filter is equivalent to a band pass filter, the frequency bandwidth being a function of σ.

This filter is optimized for a single scale. In order to obtain all the scales, the LoG operator is usually applied repeatedly at various scales. It is a very accurate operator but it requires relatively long computation times. Therefore, other methods have been developed. These methods are usually approximations of the LoG operator.

U.S. Pat. No. 6,711,293 describes a method for identifying scale invariant keypoints in an image based on difference of Gaussians using SIFT as described in Lowe. The detection is realized in a discrete space, the scale space, illustrated in FIG. 2, which comprises three dimensions: x, y and σ where σ determines the scaling factor. Various smoothing and subsampling are applied to the initial image to achieve a higher level of the pyramid. L(x, y, σ) is the result of the convolution of an image I and the Gaussian filter G(x, y, σ) of parameter σ:

$$L(x,y,\sigma) = G(x,y,\sigma)*I(x,y)$$

where the value of the scaling factor σ depends on the apparent size of the keypoints to detect. The features, whose apparent sizes are smaller than σ, are blurred. The Difference of Gaussians, DoG, illustrated in FIG. 3 (also shown in Lowe), allows a detection of features whose dimensions are approximately equal to σ:

$$DoG(x,y,\sigma) = L(x,y,k\sigma) - L(x,y,\sigma)$$

where k is a constant multiplicative factor.

FIG. 4, also shown in Lowe, illustrates how a pixel 400 is classified as a keypoint from three DoG images corresponding to succeeding scales. The value of the central pixel 400 corresponding to the scale 420 is compared to the values of its 8 neighbouring pixels indicated with circles in the same scale, with the 9 pixels of the scale 430 above (indicated with circles) and the 9 pixels of the scale 410 below (indicated with circles). When the value of the central pixel 400 is lower or higher than all of its neighbours, then it corresponds to a local minima or maxima respectively, or equivalently to a local extrema. In other words, extremas which are stable across the image and across scales are selected as candidate keypoints. Note that the DoG operator is an approximation of the Laplacian of Gaussian except for a scaling factor.

The SURF method, described in US-A-2009/0238460, permits the detection of interest points that are scale-invariant as well as rotation-invariant. This method is based on the use of Hessian-matrix approximation and performs faster than the SIFT method described above. The filter is given by the determinant of the Hessian matrix (DoH) where H(x, y, σ) is represented by the following:

$$H(x, y, \sigma) = \begin{bmatrix} L_{xx}(x, y, \sigma) & L_{yx}(x, y, \sigma) \\ L_{xy}(x, y, \sigma) & L_{yy}(x, y, \sigma) \end{bmatrix}$$

where $L_{xx}(x, y, \sigma)$ is the convolution of the Gaussian second order derivative $$\frac{\partial^2}{\partial x^2} G(x, y)$$

with the image I in the (x, y) location. $L_{xy}(x, y, \sigma)$, $L_{yx}(x, y, \sigma)$ and $L_{yy}(x, y, \sigma)$ are based on the other partial derivatives of the Gaussian. The Gaussian derivatives, illustrated in FIG. 5*a* and FIG. 5*b* are estimated with box filters, shown in FIG. 5*c* and FIG. 5*d* respectively. Their computation is evaluated using integral images in order to greatly reduce the computation time in comparison to the computation times required by the LoG and to the DoG operators.

In the SIFT method, various pyramid layers are subtracted to produce the DoG image where keypoint can be extracted, as illustrated in FIG. 4. However, in the SURF method, it is not the size of the image which is reduced to create the scale space, but the size of the filter which is increased. This allows for a gain in computation time compared to the SIFT method.

In the article entitled "*CenSurE: Center Surround Extremas for Realtime Feature Detection and Matching*" by AGARWAL et al., Lecture Notes in Computer Science Volume 5305, 2008, pages 102 to 115, a Center Surface Extrema method (CenSurE) is disclosed which uses a Difference of Boxes (DoB) approach to approximate the LoG. The use of box filters and integral images speeds up the computation time of the method.

Other methods, similar to those described above include OBAloG described in the thesis of Jakkula entitled "*Efficient feature detection using OBAloG: optimized box approximation of Laplacian of Gaussian*"; and SUSurE ("*SUSurE: Speeded Up Surround Extrema feature detector and descriptor for realtime applications*" by EBRAHIMI, M. and MAYOL-CUEVAS, W. W., in Computer Vision and Pattern Recognition Workshops, 2009, CVPR Workshops 2009, IEEE Computer Society Conference, pages 9 &14, 20-25 Jun. 2009), and many others.

In order to determine accurate keypoints at all scales, the computation of the various filters of the keypoint detection methods described above is repeated at all scales. Extremes which are stable across the image and across scales are then selected as candidate keypoints.

However, the repetition of these calculations at all scales is extremely costly in terms of computational time. When it is required to analyse a sequence of video images, for instance, the computational time to detect keypoints in an image then becomes critical and approximations of the LoG operator are no longer sufficient to improve the computational time.

In accordance with the present disclosure, a depth map is obtained from a three-dimensional imaging system to determine local scale values of objects of interest or keypoints in a captured image.

In accordance with the present disclosure, each object which is to be detected by the computer system has a fixed real world size. In one embodiment, the fixed real world sizes of certain objects lie in a predetermined or predefined range. For example, if the object to be detected is a finger, then the range of the finger size in the real world is [0.5, 2] cm depending on whether the finger is that of a child or an adult. An object viewed from different angles may also have an apparent size which changes with the viewed angle.

Real world size $w_s$ refers to the size of an object of interest in the "real world" or the actual size. The real world size $w_s$ needs to be differentiated from the apparent size of the object of interest or the size of the keypoint to which it relates in the image.

The size of an object in an image is determined by its distance to the centre of the camera. An object closer to the camera will appear bigger in the image than an object located further away. Therefore, the size of an object in the image is referred to as the apparent size $a_s$ of an object. The apparent size is also proportional to the scale s.

Assuming a 3D camera has a focal length f, then the apparent size $a_s$ (expressed in metres) in the image of an object of real world size $w_s$ at a distance d from the camera is $$a_s(d) = \frac{f}{d} \times w_s$$

However, the distance d for every pixel (i,j) of the image is contained in the depth map D. For a given object of real world size $w_s$, the apparent size of that object is:

$$\tilde{a}_s = \text{round}\left(\frac{f}{d} \times \frac{w_s}{p}\right)$$

where p is pixel size in metres.

In an image, a function of the distance d(i,j) to the camera is computed as follows:

$$\tilde{a}_s(i, j) = \frac{f}{d(i, j)} \times \frac{w_s}{p}$$

If a scale matrix is defined as the matrix containing the values of the apparent sizes $\tilde{a}_s(i,j)$ for each pixel or groups of pixels within the image (irrespective of whether the pixels are associated with an object of interest) as:

$$M = \begin{pmatrix} \tilde{a}_s(1, 1) & \cdots & \tilde{a}_s(1, n) \\ \vdots & \ddots & \vdots \\ \tilde{a}_s(m, 1) & \cdots & \tilde{a}_s(m, n) \end{pmatrix}$$

where m is the number of rows and n is the number of columns of the array of pixels of the captured image.

The real world size $w_s$ can be set by the user or it can be adapted to the type of application running on the computer system, for instance depending on the parts of the human body to be tracked.

State of the art methods for the detection of keypoints are repeatedly executed at every scale s as described above, in the scale space pyramid. The three dimensional scale space pyramid of the prior art methods can be compared to the three dimensional image. The third dimension of the pyramid is the scale whereas the third dimension of the three dimensional image is the depth, the scale being inversely proportional to the depth, or equivalent to the distance from the 3D camera.

In the computer-implemented method according to the present disclosure, the scale space pyramid of the prior art methods is replaced by the scale matrix M, as described above. The method according to the present disclosure is applied only once. It is the computation of the scale matrix M which permits the method to be applied only once per image.

All the methods described above can be used for the detection of keypoints in an image: LoG, DoG (or SIFT), DoH (SURF), OBAloG, SUSurE, etc. In a particular embodiment of the present disclosure, the CenSurE box approximation method is used for its simplicity of use, good performance and fast computational speed and is therefore described in more detail below. However, the present disclosure is not limited thereto. In another embodiment of the present disclosure, the OBALoG or DoH methods are used for finer approximations.

The CenSurE method approximates the LoG filter using a combination of box filters having different sizes and centred on the same pixel. The inner box filter having a size 2s+1 is subtracted from the outer box filter having a size 2(2s)+1 and results in a Difference of Boxes filter (DoB). This DoB can be seen as a squared ring. The scale parameter s is equivalent to the standard deviation a of a Gaussian. The squared ring filter approximates the LoG filter illustrated in FIG. 1b.

FIG. 6 illustrates the box filters used according to the disclosure to approximate the LoG filter. In a preferred embodiment, the size of the outer box 730 is t×2(2s)+1 and the size of the inner box 720 is (2s+1). Advantageously, t=2. Both boxes are centred on the shaded pixel 740 and the difference of the outer box 730 and the inner box 720 results in the squared ring 710 which corresponds to the DoB filter.

The convolution of the input image I with the DoB filter results in the response of the image to the filter, called the centre surround response CS(s), which is a function of the scale parameters. It can be expressed by the following equation:

$$CS(s) = DoB(s) \otimes I$$

where DoB(s) is the Difference of Boxes filter, which also depends on the scale parameter s. The convolution can be calculated as following:

$$CS(i, j, s) = \sum_{k=-d_1}^{d_1} \sum_{l=-d_2}^{d_1} DoB(k, l, s) I(i-k, j-l)$$

where $d_1$ and $d_2$ correspond to half of the size of the DoB filter expressed in pixels. This is valid as long as the coordinates $i \geq d_1$, $i < m-d_1$ and $j \geq d_2$, $j < n-d_2$ where m,n are the dimensions of the input image I. However, the calculation of the convolution requires many additions and multiplications. This way of calculating the centre surround response of the filter comprises two steps, the construction of the filter DoB(k,l,s) for every pixel and its application to the image with the convolution.

However, this convolution can be simplified since the convolution is equivalent to the computation of the area within the squared ring 710, as expressed by the following equation:

$$CS(i, j, s) = \frac{\sum_{out}}{(t(2s)+1)^2} - \frac{\sum_{in}}{(2s+1)^2}$$

where $\Sigma_{out}$ and $\Sigma_{in}$ correspond to the sum of the pixel values of the input image I inside the outer box and inside the inner box respectively. The denominators of both terms are the areas of the outer box and of the inner box respectively. Therefore, the first term and second term of the equation are the average values of the input image I inside the outer box and inside the inner box respectively. The construction of the filter and its application to the image are combined in one step.

In a preferred embodiment of the present disclosure, the sums are efficiently computed using the integral image technique described above. Preferably, the terms $1/(t(2s)+1)^2$ and $1/(2s+1)^2$ are tabulated for every value of s to improve the computational time. When a sequence of images is to be analysed, the terms can be stored for use in the processing of subsequent images.

In all the methods described above, the filter is applied repeatedly at all scales. In the case of the CenSurE detector as described above, 7 different scales are usually used.

According to the present disclosure, the scale parameter s varies across the input image I. As described above, this parameter is equivalent to the supposed apparent size $\tilde{a}_s(i,j)$ whose values are stored in the scale matrix M. Therefore, the centre surround filter response CS, according to the present disclosure, can be expressed with the following expression:

$$CS(i, j, \tilde{a}_s(i, j)) = \frac{\sum_{out}}{(t(2\tilde{a}_s(i, j))+1)^2} - \frac{\sum_{in}}{(2\tilde{a}_s(i, j)+1)^2}.$$

The response of the CenSurE filter CS, is a two-dimensional image which requires further post processing to refine the keypoints in a subsequent step.

The principle of the method is to convolve (using multiplications and additions) the input image I with the DoB filter. The convolution of the input image with the inner box filter is subtracted from the convolution of the input image with the outer box filter. A weighting factor multiplies each term in order to apply a filter with no background component. Each convolution is then normalised by dividing each filter with its area.

In order to approximate better the circular Laplacian, octagons, hexagons, or, more generally any other regular polygon having 2n sides where n is bigger or equal to 2, are also used. However, these require slightly longer computational times.

In the SURF method as described above, the computation of an integral image $\Sigma$ allows an improved computational time of convolutions with box type filters. Each pixel value $\Sigma(i,j)$ of an integral image $\Sigma$ is calculated as the sum of all the pixels $k \leq i$ and $l \leq j$ in the input image I.

$$\sum(i, j) = \sum_{k=0}^{i} \sum_{l=0}^{j} I(k, l)$$

Figure 7:
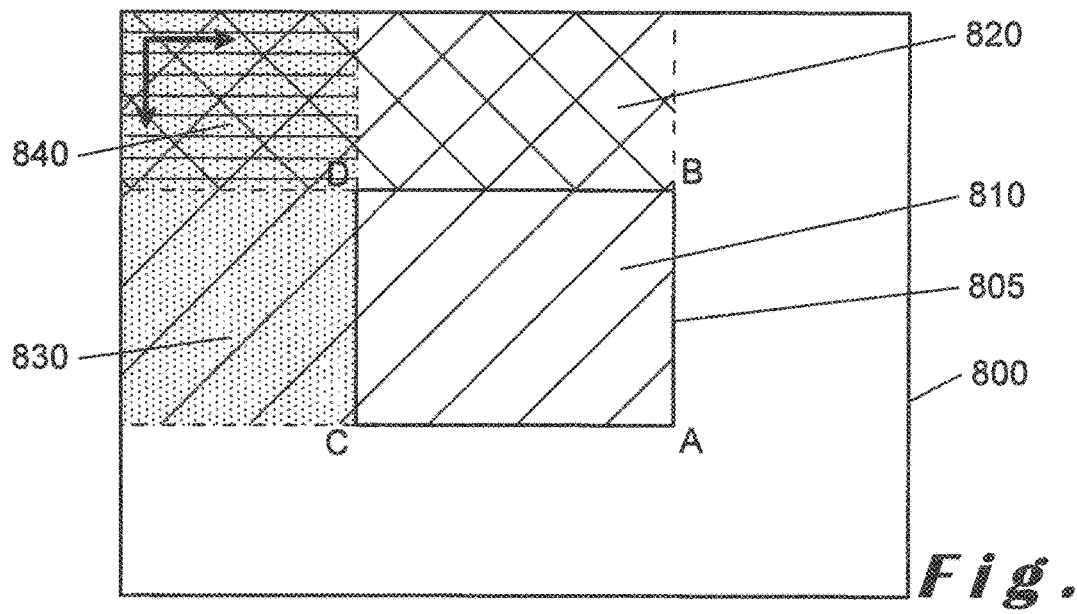
FIG. 7 illustrates integration according to the SURF method.

Once the integral image has been computed, the intensities within a rectangular area ABCD are computed with only three additions, as illustrated in FIG. 7 and:

$$\Sigma_{ABCD} = \Sigma_A - \Sigma_B - \Sigma_C + \Sigma_D$$

where $\Sigma_A$ corresponds to the diagonally hatched area 810, $\Sigma_B$ corresponds to the diagonally cross-hatched area 820, $\Sigma_C$ corresponds to the dotted area 830 and $\Sigma_D$ corresponds to the area 840 illustrated with diagonally cross-hatched, dots and horizontal lines. This method is called an integral image technique as described in more detail below.

Figure 8:
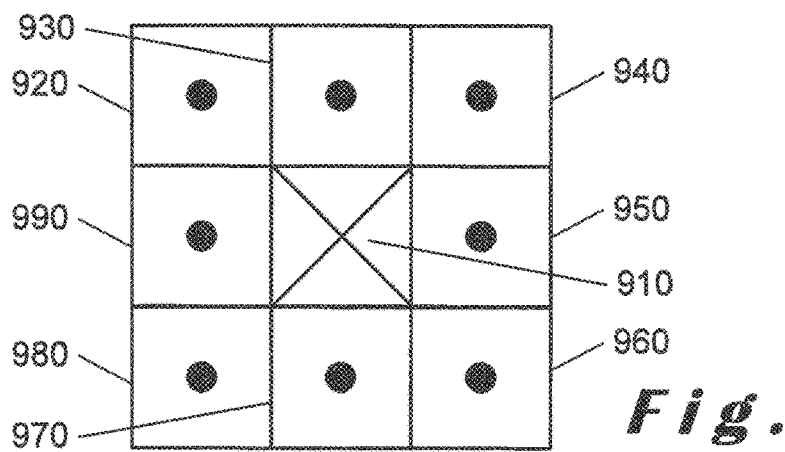
FIG. 8 illustrates the extraction of extremas of the response of the filter according to the disclosure.

A primary keypoint of interest is a local maximum of $CS(i,j,\tilde{a}_s(i,j))$. FIG. 8 illustrates a method to detect a local maximum. The value of the pixel 910 is compared to its 8 neighbours 920, 930, 940, 950, 960, 970, 980 and 990. When its value is higher than the value of each of its 8 neighbours, then this pixel is classified as a potential keypoint of interest. However, this computation needs to be performed at different scales in order to determine an actual keypoint of interest from the potential keypoints of interest as the distances of potential keypoints of interest from the imaging system are not known. For example, if the other algorithms, such as SIFT, SURF & CenSurE, have a complexity of O(N), they have to reapply the a keypoint detection at each scale of the image. So, the final complexity will be like O(N×C) where 'C' is the number of scaling steps needed. Hence, the greater the number of scales needed, the higher the computation cost. It will readily be appreciated that the number of scaling steps required is application and input resolution image dependent.

It is also possible to use local minima as well as extremas, that is, both minima and maxima.

As described above, the real world size of an object is unknown and therefore a determination needs to be made at several scales, and, the selection of keypoints of interest is determined from the scale which provides the best response. Such methods, due to their requirement for repetitive processing at different scales, requires high processing resources (power and time). This is in contrast to the method of the present disclosure where keypoints can readily determined as the real world size of an object, and hence the keypoint size, is determined from the depth map. As such, the method of the present disclosure requires less proceeding resources (both power and time).

Another method to detect a local maxima is to compare the value of a pixel (i,j) to the values of all the pixels located within a window centred on the pixel (i,j) and whose size is half of the supposed apparent size $\tilde{a}_s(i,j)$ of the pixel.

A specific detector or classifier is applied to the filter response CS and is tuned to detect a particular subset of keypoints. This post-processing can be more computationally demanding as it implies a finer analysis. However, this analysis is performed on a greatly reduced number of pixels which are considered as being potential keypoints of interest. At least one of the following methods may be used: FAST-like 12 directions corner/extremity classification; edge keypoint suppression by Harris-like criterion; random Forest with 'superpixels' having an adapted local scale.

Keypoints can be further pruned/refined by setting the condition that they must be local maxima in the range of possible scales for the object of interest, the method being to follow the local maxima in scale-space and only retain maxima that do not fall outside of the possible range of scales.

The method described above is very fast and robust. All the potential keypoints of the input image are included. The number of operations required to calculate the response to the CenSurE filter is 9 as illustrated in Table 1 below:

TABLE 1

|  | Number of elementary operations per pixel |
| --- | --- |
| First box | 3 additions + 1 multiplication |
| Second box | 3 additions + 1 multiplication |
| Difference of boxes | 1 addition |
| Total | 9 elementary operations per pixel |

Although the CenSurE filter requires only 9 operations per pixel to derive potential keypoints, the output is still distance-dependent and the operations need to be performed at different scales, and, appropriate (high) processing resources are required.

As described above, it is possible to use distance-independent image filtering to compute a distance independent DoB filter tuned to detect keypoints of physical half size r:

$$DoB_r(i,j) = DL_r(i,j) - DL_{kr}(i,j)$$

where the factor k tunes the relative scale of the boxes involved in the difference computation, as was defined above for DoG filters. The factor k should be set greater than 1, a typical value being a factor k=2.

In order to obtain a filter invariant to linear intensity rescaling of an input image, the response of the DoB filter may be normalized by the center response, leading to a Distance Independent Keypoint (KID) filter:

$$KID_r(i, j) = \frac{DoB_r(i, j)}{DL_r(i, j)} = 1 - \frac{DL_{kr}(i, j)}{DL_r(i, j)}$$

This filter gives both positive and negative values with respective positive (or negative) values corresponding to pixels where the input image is locally brighter (or darker) in the central window (of size r) than in the surrounding window (of size kr).

Keypoints locations then correspond to spatial local maxima or minima of the response of this filter. Local maxima are meaningful keypoints only at positive response locations whereas local minima are meaningful keypoints only at negative response locations of the filter.

Splitting the KID filter response image into two components, namely, the positive and the negative responses, as follows:

$$KID_r^+(i, j) = \begin{cases} KID_r(i, j) & \text{if } KID_r(i, j) > 0 \\ 0 & \text{otherwise} \end{cases}$$

and $$KID_r^-(i, j) = \begin{cases} -KID_r(i, j) & \text{if } KID_r(i, j) < 0 \\ 0 & \text{otherwise} \end{cases}$$

Positive and negative keypoints respectively correspond to local maxima and local minima of the KID filter response.

Figure 9:
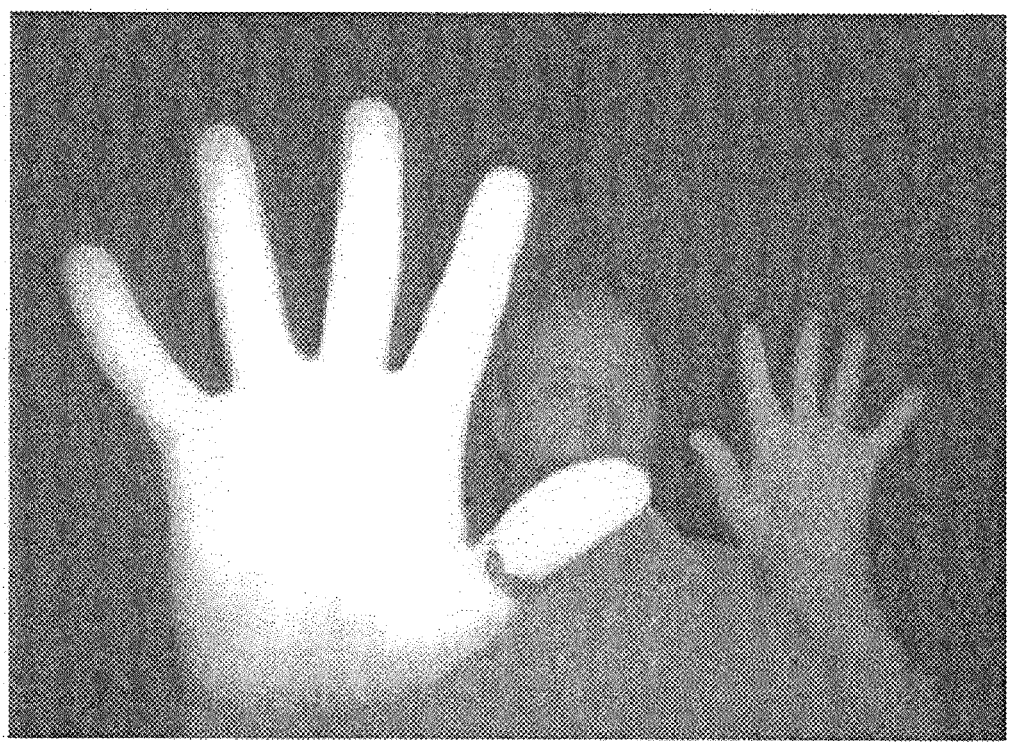
FIG. 9 illustrates an input image for keypoint detection.
Figure 10:
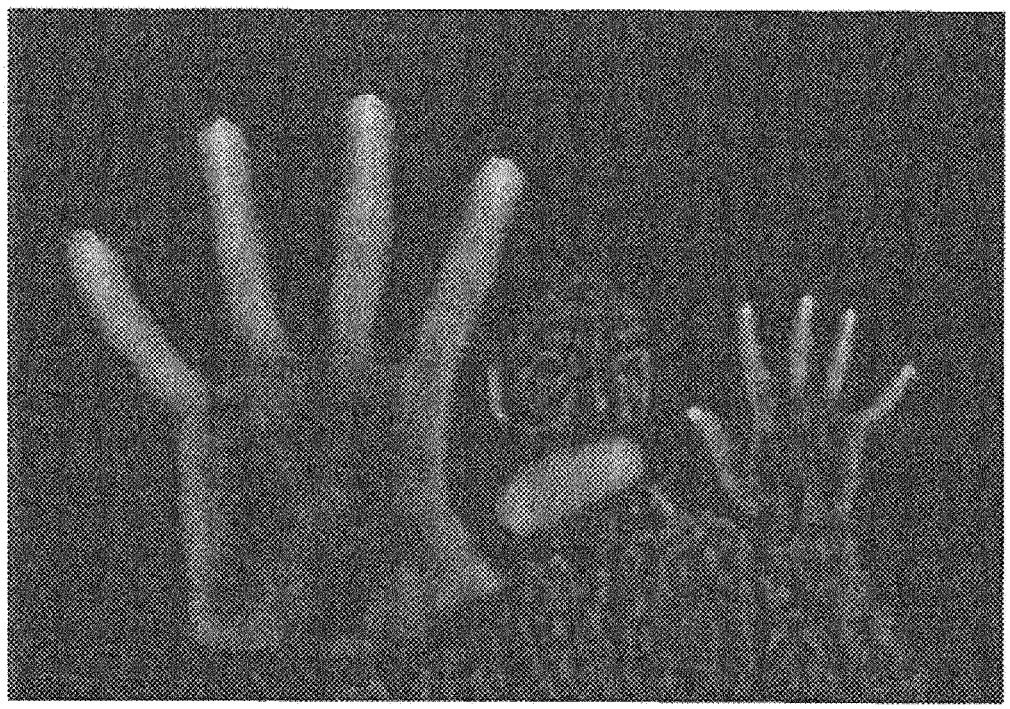
FIG. 10 illustrates an output response a keypoint distance-independent (KID) filter for r=7 mm.

An input image is shown in FIG. 9 with an output result obtained using a KID filter is shown in FIG. 10. The filter is tuned to respond to keypoints of characteristic radius, r, of 7 mm, which roughly corresponds to half the width of a finger. As shown in FIG. 10, one clearly sees that the filter response is both independent of the distance and of the brightness of objects, providing a single, well localized peak of fixed intensity for objects which match the physical size to which the filter is tuned.

Figure 11:
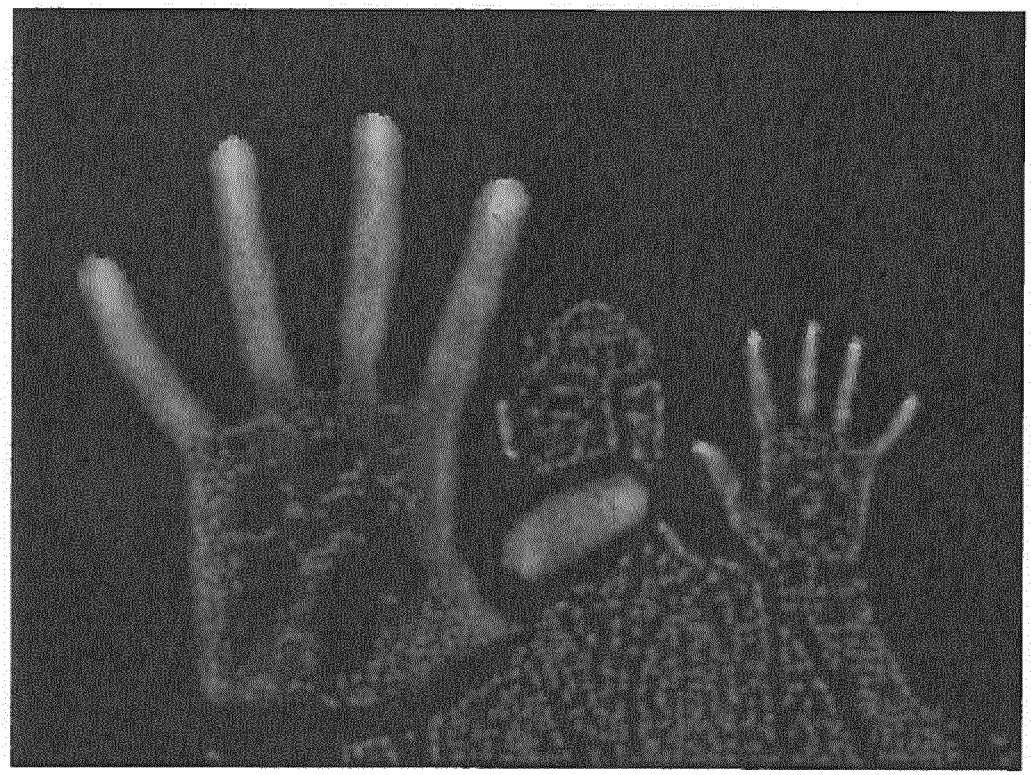
FIG. 11 illustrates local maxima over a 3×3 neighborhood of the KID filter response shown in FIG. 10.

The extraction of local maxima and minima corresponding respectively to positive and negative responses is made to a locally adaptive scale. Indeed, extracting local maxima using a fixed neighborhood, for example, a 3×3 window (in a similar way to conventional keypoint extraction methods, such as, SIFT or SURF) leads to multiple detections which are not consistent with the fact that the KID filter was locally tuned to respond to features of a specific size. Using a fixed, small (3×3) neighborhood, many keypoints are extracted which are closer to one another than the local window size corresponding to the physical size r. An example of such a result is shown in FIG. 11 where local maxima are shown over a 3×3 neighborhood of the positive KID filter response shown in FIG. 10 and indicated by small circles. Here, r=7 mm.

Figure 12:
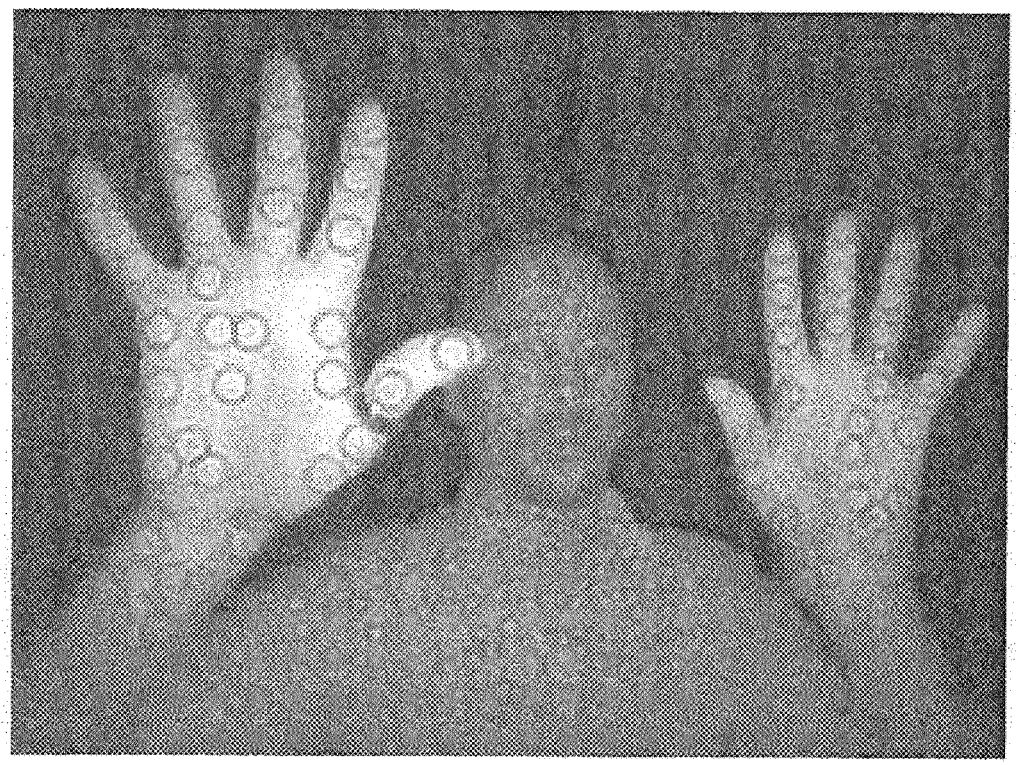
FIG. 12 illustrates KID keypoints for r=7 mm superimposed on an input image similar to that of FIG. 9.
Figure 13:
FIG. 13 illustrates KID keypoints for r=7 mm superimposed on a KID filter positive response similar to that of FIG. 10.

FIG. 12 illustrates KID keypoints for r=7 mm superimposed on the input image as shown in FIG. 9. FIG. 13 illustrates the KID keypoints for r=7 mm superimposed on the positive KID filter response shown in FIG. 10.

Figure 14:
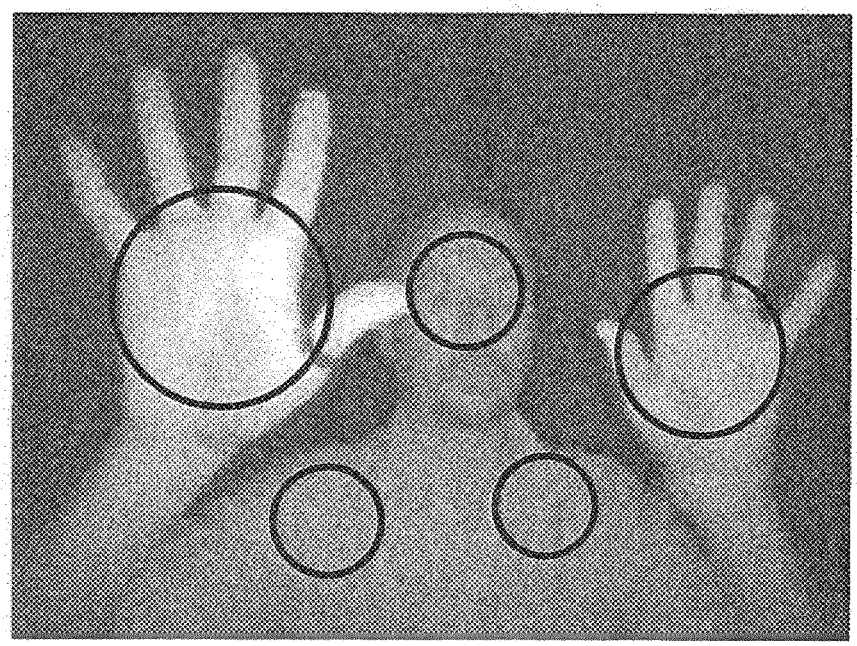
FIG. 14 is similar to FIG. 12 but illustrates KID keypoints for r=5 mm.
Figure 15:
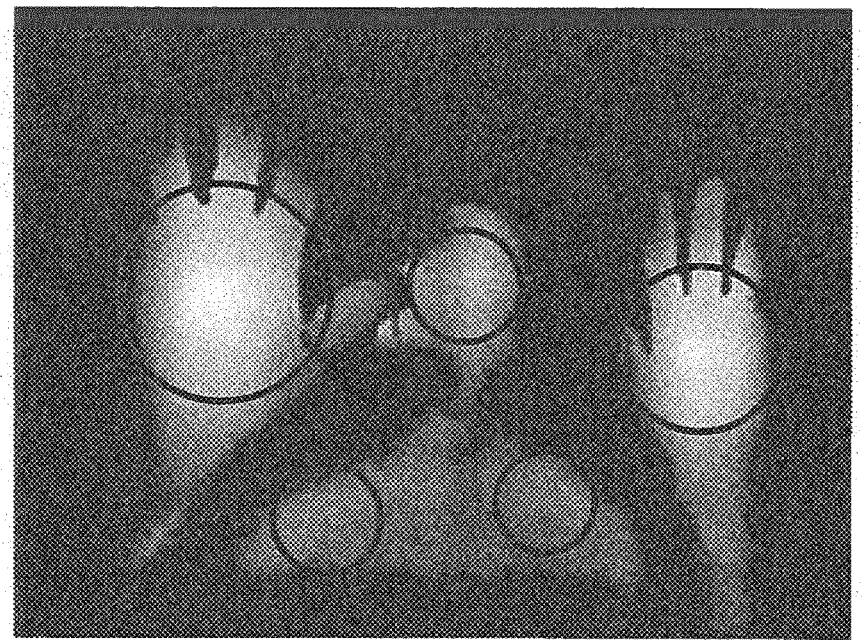
FIG. 15 is similar to FIG. 13 but illustrates the KID keypoints for r=5 mm.

In order to appreciate the effect of changing the characteristic r, FIG. 14 is similar to FIG. 12 but illustrates the KID keypoints for r=5 cm, and, FIG. 15 is similar to FIG. 13 but illustrates the KID keypoints for r=5 cm.

However, to be consistent with the object of the present disclosure, a keypoint at (i,j) should correspond to a maximum response value in accordance with its own local scale. This means that there should be no response values higher than such a maximum response within the window of half size defined by:

$$s = \frac{fr}{D(i, j)}$$

However, testing for maxima over large and varying size neighborhoods necessitates a high processing load. In accordance with the present disclosure, an alternative method is used which is based on a "mean shift" principle to extract modes of a density function. Such a "mean shift" principle is disclosed in the article entitled "The Estimation of the Gradient of a Density Function with Applications in Pattern Recognition" by FUKUNAGA, Keinosuke and HOSTETLER, Larry D. (January 1975), IEEE Transactions on Information Theory (IEEE), 21(1): pages 32 to 40).

For a $KID_r^+$ response as a density function of a position, X, in an image grid, G, the mean shift algorithm, M, starts from an initial position $M_0=(x_0,y_0)$ and seeks the local mode of the density by iteratively computing the weighted mean position as follows:

$$M_{n+1} = \frac{\sum_{X \in G} w(X, M_n) X}{\sum_{X \in G} w(X, M_n)}$$

where the weight w depends on the density and the distance of the point to the previous iteration position through a kernel function, K:

$$w(X, M_n) = K(X - M_n) KID_r^+(X)$$

The "mean shift" itself is the displacement of this weighted mean between two iterations, so it is defined as the difference vector:

$$S_{n+1} = M_{n+1} - M_n$$

The critical parameter of the mean shift algorithm is the kernel function, and more particularly, the kernel size. A usual kernel is a Gaussian kernel which is governed by a scale parameter of the Gaussian function. The extent of the kernel corresponds to the influence distance of the density samples, and, therefore, to the size of the modes to be determined.

By using a flat kernel with spatial extent locally tuned to the local apparent scale, as described above, in the context of density estimation, this corresponds to using a Parzen window density estimate. In this way, the mean shift vector can efficiently be computed for every pixel of the response image with an adaptive kernel size per pixel.

For a pixel (x, y), the mean shift vector for physical size r is provided by:

$$S_r(x, y) = \begin{pmatrix} \frac{DS_{xKID_r^+}(x, y, s)}{DS_{KID_r^+}(x, y, s)} - x \\ \frac{DS_{yKID_r^+}(x, y, s)}{DS_{KID_r^+}(x, y, s)} - y \end{pmatrix}$$

where, as described previously, $DS_I(x, y, s)$ denotes the sum of the image I over a window of half size s centered at (x, y). This shows that a dense mean shift vector field can be computed efficiently using 3 integral images, one for $xKID_r^+$, one for $yKID_r^+$ and one for $KID_r^+$.

In the mean shift algorithm, the modes of the density correspond to convergence points of the mean shift field, that is, the points where the mean shift vector is zero and where the local field is convergent.

The vector $S_r(x,y)$ equals to 0, if and only if, its two components are null. Hence, keypoints lie at the intersections between the 0-isolines of the mean shift field components.

These isolines can be extracted using a variant of the "marching squares" algorithm disclosed by MAPLE, C. in "*Geometric design and space planning using the marching squares and marching cube algorithms*", 2003, Proc. 2003 Intl. Conf. Geometric Modeling and Graphics, pages 90 to 95.

Figure 16:
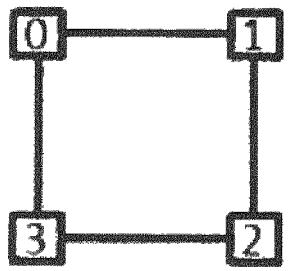
FIG. 16 illustrates corner numbering for a square for a "marching squares" algorithm.

The "marching squares" algorithm traverses an input image by considering successive squares made up of 4 adjacent pixels (i, j), (i+1, j), (i+1, j+1) and (i, j+1). For a square whose top-left corner is located at (i, j) in the image, numbering the four corners in a clockwise direction, starting from pixel (i, j) which receives the index 0, the pixel (i+1, j) is then numbered 1, the pixel (i+1, j+1) is numbered 2 and the pixel (i, j+1) is numbered 3 as shown in FIG. 16.

For one component of the mean shift field, a 0-isoline of this component crosses the square, if and only if, the value of the component is positive on some corners of the square and negative on some others. As in the original "marching squares" algorithm, the different configurations are classified depending on the sign of the component at the corners, leading to one of 16 possibilities for each square.

The ith corner is associated to the ith bit of a configuration code, the ith bit being set to 1 if the field component is positive at the corresponding corner, and, to 0 otherwise. In order to avoid a 0-isoline crossing just at a corner, zero values of the field component are preliminarily set to a very small positive value. As in the original "marching squares" algorithm, the different configurations can lead to 0, 1 or 2 segments of the 0-isoline being inside a square.

The "2 segments" case arises in the presence of a saddle point in the field component and is discarded as two zero crossings inside a pixel constitute too small a feature to correspond to a valid keypoint. Therefore, possible and valid squares always contain one segment of the 0-isoline.

As in the original "marching squares" algorithm, the intersection points of the isolines with the squares are determined by linear interpolation, the corners involved in the interpolation for each configuration having been tabulated beforehand.

The difference with the original "marching squares" algorithm and that of the present disclosure is that not all "1 segment" cases correspond to valid cases. In particular, only 0-isolines along which the mean shift field component is convergent are required.

Figure 17:
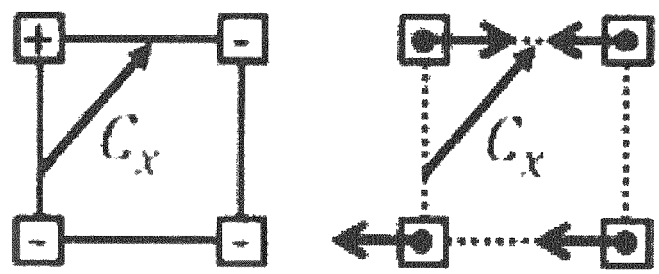
FIG. 17 illustrates an example of a convergent mean shift field x-component inside a "marched square"
Figure 18:
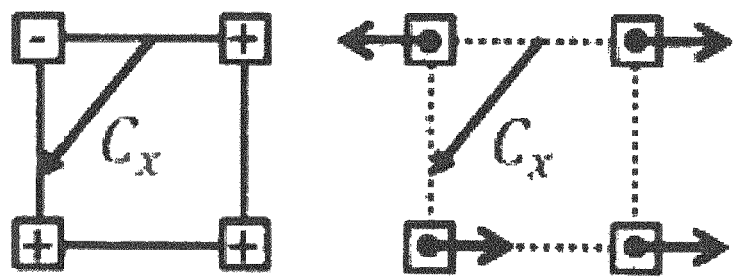
FIG. 18 illustrates an example of a divergent mean shift field x-component inside a "marched square"

Referring to FIGS. 17 and 18, convergent and divergent configurations are shown respectively which correspond to configuration 1 having a configuration code (0001) and configuration 14 having a configuration code (1110). It will readily be appreciated that configuration 1 and configuration 14 are complementary configurations.

Starting with FIG. 17 and configuration 1 (configuration code (0001)), drawing the mean shift field x-component orientation at the corners of the square, starting at the top right hand corner, clearly shows that configuration 1 corresponds to a locally convergent x-component with '+' values moving to the right and '−' values moving to the left.

Similarly, in FIG. 18, drawing the mean shift field x-component orientation at the corners of the square, starting at the top right hand corner, clearly shows that configuration 14 (configuration code (1110)) corresponds to a locally divergent x-component.

Figure 19:
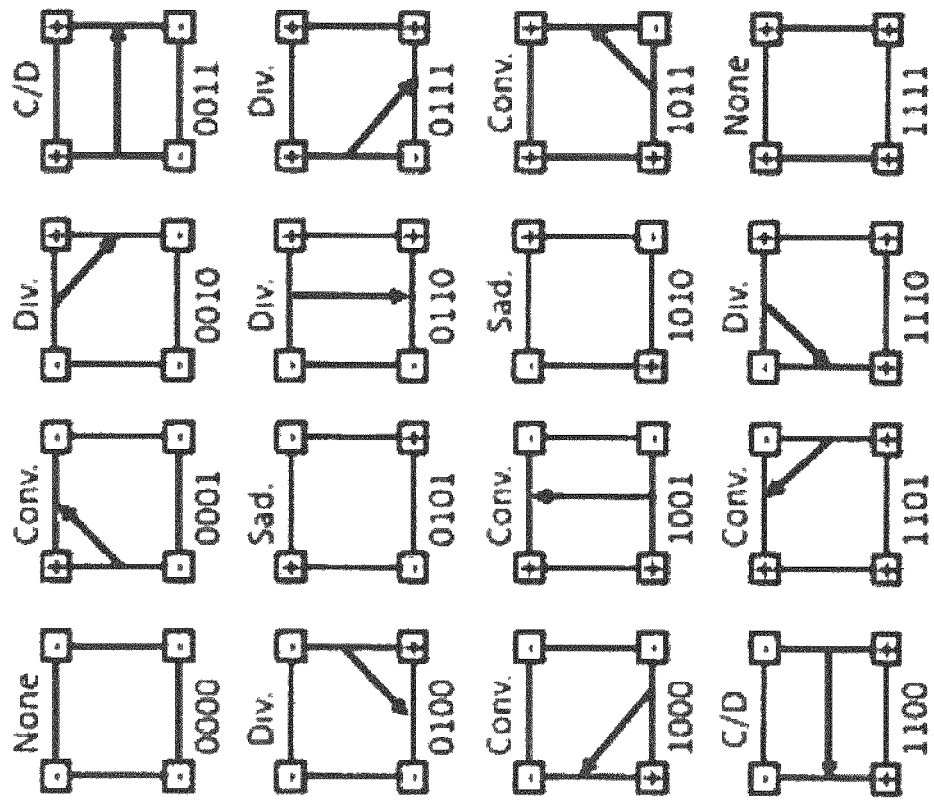
FIG. 19 illustrates all possible "marching squares" configurations for the extraction of a 0-isoline x-component of the mean shift field.

Whilst only configurations 1 and 14 (configuration codes (0001) and (1110) respectively) have been shown in FIGS. 17 and 18, all the "marching squares" configurations for the extraction of the x-component of the mean shift field are shown in FIG. 19. The configuration code is indicated below each configuration (in binary) with the sign of the x-component of the field being indicated at each corner of the square. The type of configurations can be one of: 'None' (as no isoline crossing the square); 'Conv' or convergent (one isoline and convergent field—valid configuration); 'Div' or divergent (one isoline and divergent field—invalid configuration); 'C/D' or neither convergent nor divergent (one isoline, convergent or divergent field depending on the slope of the isoline); and 'Sad' or saddle point (two isolines—invalid configuration).

In FIG. 19, it will readily be appreciated that there are two configurations with no isoline passing through the square, namely, configurations 0 and 15 (configuration codes (0000) and (1111) respectively); two saddle point configurations, namely, configurations 5 and 10 (configuration codes (0101) and (1010) respectively); five convergent configurations, namely, configurations 1, 8, 9, 11 and 13 (configuration codes (0001), (1000), (1001), (1011) and (1101) respectively); 5 divergent configurations, namely, configurations 14, 7, 6, 4 and 2 (configuration codes (1110), (0111), (0110), (0100) and (0010) respectively); and two configurations which can be neither convergent or divergent, namely, configurations 3 and 12 (configuration codes (0011) and (1100) respectively).

Figure 20:
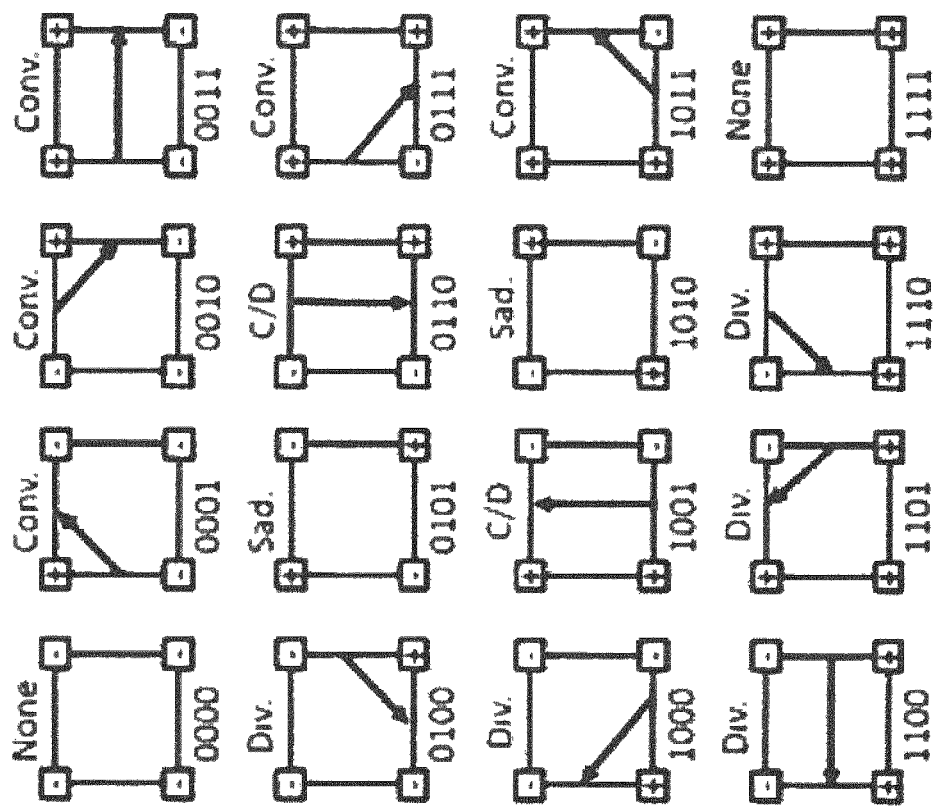
FIG. 20 illustrates all possible "marching squares" configurations for the extraction of a 0-isoline y-component of the mean shift field.

FIG. 20 is similar to FIG. 19 but illustrates the "marching squares" configurations for the extraction of the 0-isoline for the y-component of the mean shift field. In a similar way to FIG. 19, there are two configurations with no isoline passing through the square, namely, configurations 0 and 15 (configuration codes (0000) and (1111) respectively); two saddle point configurations, namely, configurations 5 and 10 (configuration codes (0101) and (1010) respectively); five convergent configurations, namely, configurations 1, 2, 3, 7 and 11 (configuration codes (0001), (0010), (0011), (0111) and (1011) respectively); 5 divergent configurations, namely, configurations 14, 13, 12, 8 and 4 (configuration codes (1110), (1101), (1100), (1000) and (0100) respectively); and two configurations which can be neither convergent or divergent, namely, configurations 3 and 6 (configuration codes (0011) and (0110) respectively).

In order to discriminate between convergent and divergent fields for ambiguous configurations (configurations 3 and 12 (configuration codes (0011) and (1100) respectively) for the x-component and 6 and 9 (configuration codes (0101) and (1001) respectively (for the y-component), a geometrical test is needed.

If $C_x$ is an isoline segment for the x-component and $C_y$ is an isoline segment for the y-component within a given square, by ensuring that $C_x$ is oriented so that the x-component of the field is positive to its left and that $C_y$ is oriented so that the y-component is positive to its left, it is possible to verify that $C_x=(C_x^x, C_x^y)$ is a contour segment corresponding to a locally convergent field, if and only if, $C_x^y<0$. Similarly, it is possible to verify that $C_y=(C_y^x, C_y^y)$ is a contour segment corresponding to a locally convergent field, if and only if, q>0. It will readily be appreciated that this is always verified for configurations 1, 8, 9, 11 and 13 (configuration codes (0001), (1000), (1001), (1011) and (1101) respectively) for the x-component, but that it needs to be explicitly tested for the two ambiguous configurations 3 and 12 (configuration codes (0011) and (1100) respectively). The same applies for the corresponding configurations of the mean shift field y-component as shown in FIG. 20 but not described in detail here.

In accordance with the present disclosure, keypoints are extracted from the KID filter response, and the following steps are performed:
 compute the dense mean shift field $S_r$ using fast DI filtering with integral images; and
 using "marching squares", for each square independently, determine:
  configuration codes for the x- and y-components of the mean shift field;
  using a separate lookup table for each component, whether both codes correspond to potentially valid configurations (configurations 1, 3, 8, 9, 11, 12 and 13 (configuration codes (0001), (0011), (1000), (1001), (1010), (1011) and (1100) respectively) for the x-component, and, configurations 1, 2, 3, 6, 7, 9 and 11 (configuration codes (0001), (0010), (0011), (0110), (0111), (1001) and (1011) respectively) for the y-component);
  if both configurations are potentially valid then:
   compute the isoline segments $C_x$ and $C_y$ by linear interpolation of the component zero crossing using a lookup table indicating the corners to consider in the interpolation with respect to the configuration codes;
   if the configuration for the x-component is unambiguous (configuration 1, 8, 9, 11 or 13 (configuration code (0001), (1000), (1001), (1011) or (1101) respectively), or $C_x^y<0$ and the configuration for the y-component is unambiguous (configuration 1, 2, 3, 7 or 11 (configuration code (0001), (0010), (0011), (0111) or (1011) respectively), or $C_y^x>0$ then:
    compute the intersection between $C_x$ and $C_y$;
    if the intersection point belongs to the relevant square then create a keypoint at this location.

Figure 21:
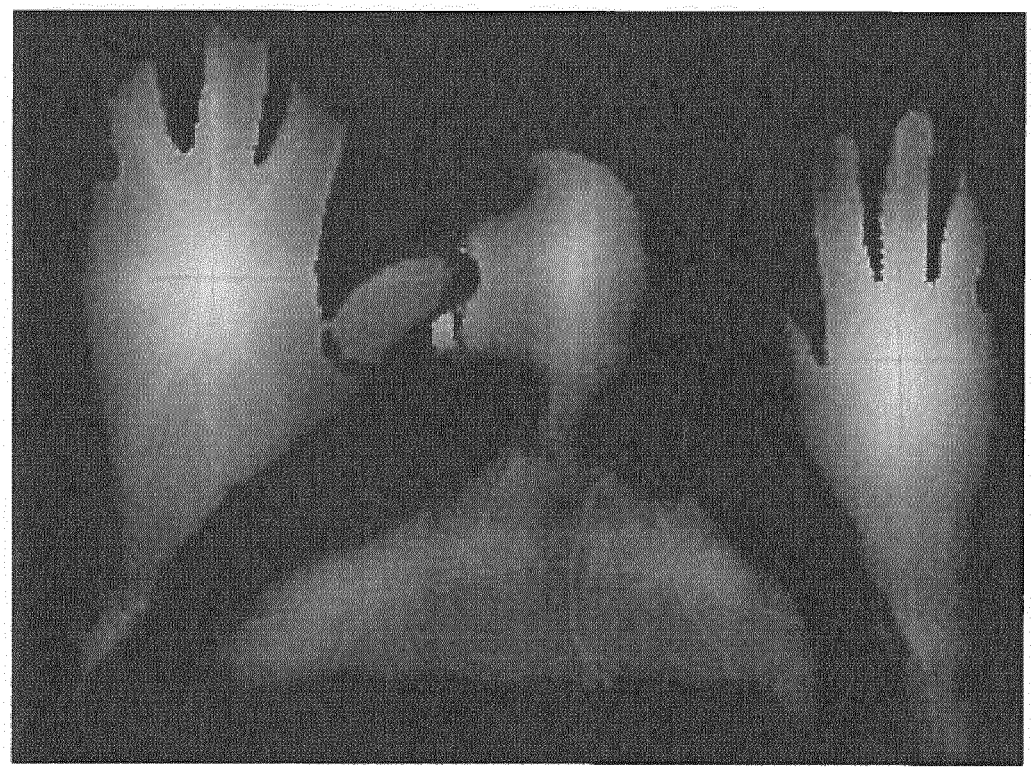
FIG. 21 illustrates a mean shift vector field and 0-isolines of mean shift field components for r=5 cm in accordance with the present disclosure.
Figure 22:
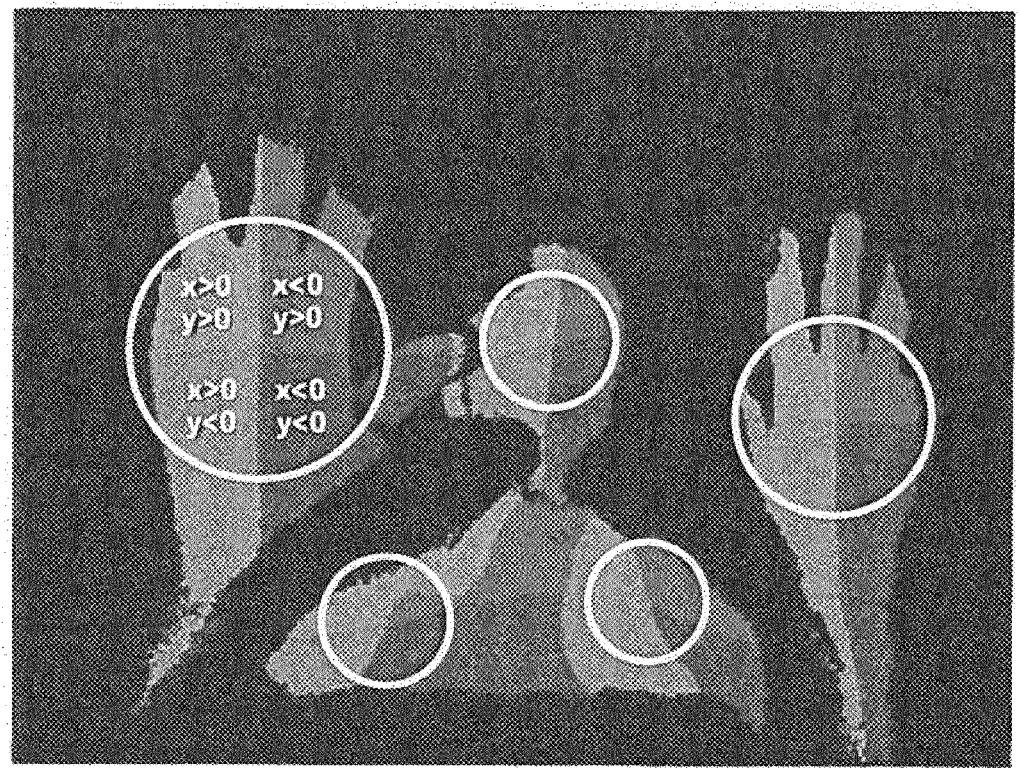
FIG. 22 illustrates a mean shift vector field sign, 0-isolines of the field components and keypoints for r=5 cm in accordance with the present disclosure.
Figure 23:
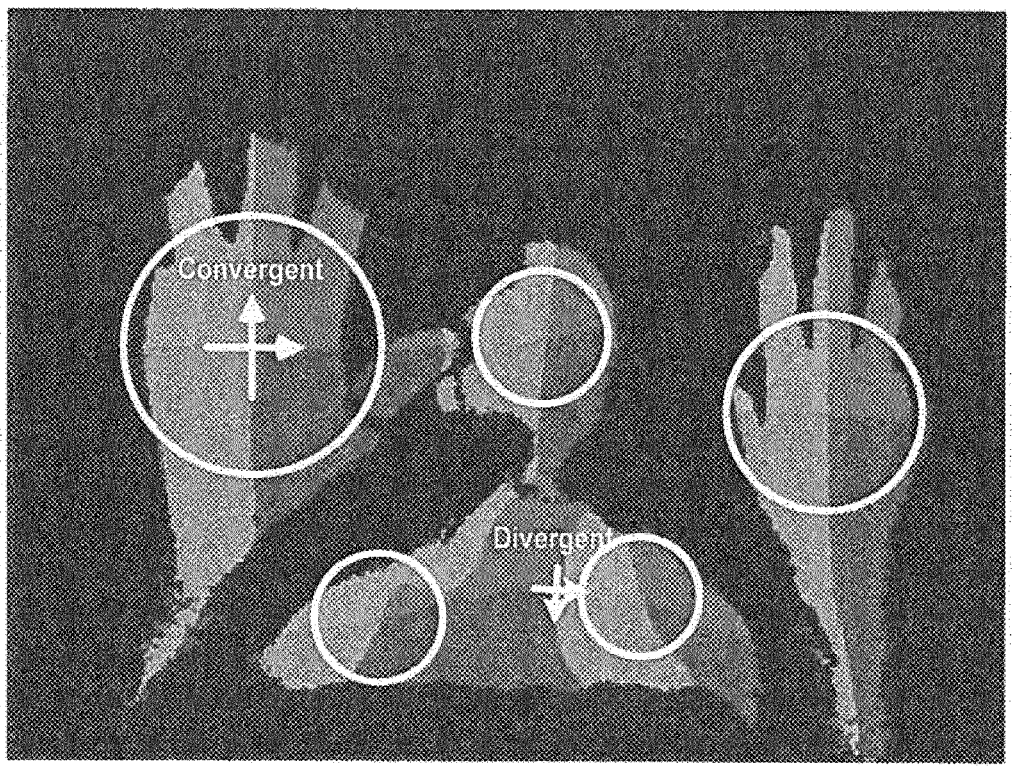
FIG. 23 illustrates isoline intersections corresponding to a locally convergent or divergent field in accordance with the present disclosure.

FIGS. 21 to 23 illustrate the steps of the method described above. FIG. 21 illustrates the mean shift vector field and 0-isolines of the x- and y-components of the mean shift field for a characteristic where r=5 cm; FIG. 22 illustrates the mean shift vector field sign, 0-isolines of the x- and y-components, and keypoints for r=5 cm; and FIG. 23 illustrates the isoline intersections corresponding to a locally convergent and divergent fields where only convergent points corresponding to valid keypoints are shown.

Figure 25:
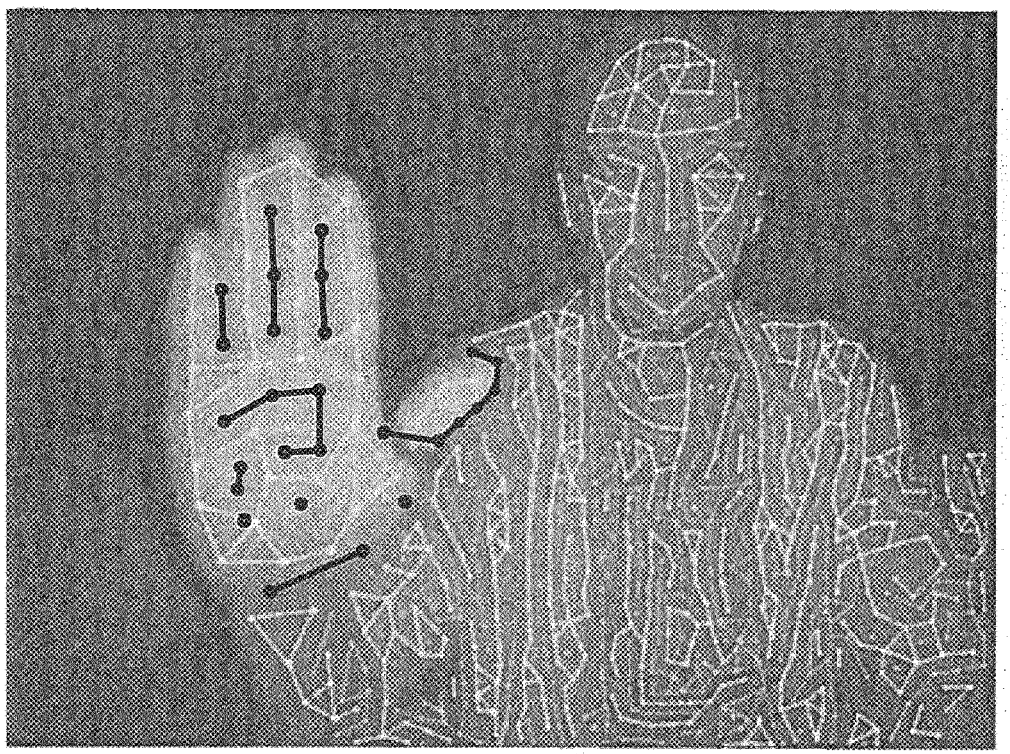
FIG. 25 illustrates positive and negative keygraph nodes and edges corresponding to the keypoint influence zones shown in FIG. 24.

Having determined the keypoints, it is possible to determine a keygraph illustrating such points. Apart from the maxima response values which provide meaningful keypoints, the positive and negative responses of a KID filter ($KID_r^+$ and $KID_r^-$) also provide relevant topological information. In effect, the sets of positive and negative response values of the KID filter form two complementary sets, and, the connectivity between positive keypoints inside positive zones and the connectivity between negative keypoints inside negative zones define a graph structure as shown in FIG. 25 described in more detail below.

For each pixel of an image which is associated with only one keypoint, this pixel is in an influence zone of the keypoint with which it is associated. Positive response pixels are in the influence zone of positive keypoints, while negative response pixels are in the influence zone of negative keypoints. The simplest way to define influence zones is to rely on geodesic distances within the positive and negative responses sets. A pixel is then associated with the closest keypoint having the same sign as itself, in the sense of this geodesic distance. Again, the simplest geodesic distance for digital images is the digital path distance, for which neighboring pixels for a given discrete topology setup (e.g. 4 or 8 connectivity) and which have the same KID filter response sign are given a fixed unit distance, while all other pairs of pixels are given infinite distance.

Figure 24:
FIG. 24 illustrates a keygraph with keypoint influence zones.

The influence zones can naturally be represented by a label image in which each pixel is labeled with an index of the keypoint with which it is associated. Keypoint influence zones are shown in FIG. 24.

For the digital path distance definition of the influence zones, a full labeling of the influence zones of the keypoints by concurrent region growing from the positions of the keypoints.

Any two adjacent influence zones (for the same discrete topology, e.g. 4 or 8 connectivity), then define an edge in the keygraph structure, which is defined as a labeled graph:

$$KG=(N,E,L_N,L_E)$$

where:

N is the set of nodes of the graph, which correspond to the union of $KID_r^+$ and $KID_r^-$ keypoints;

E is the set of the edges of the graph, which correspond to adjacent keypoints influence zones;

$L_N$ is the node labeling function, for which each node can be labeled as positive or negative; and $L_E$ is the (induced) edge labeling function, for which: edges between pairs of positive nodes are labeled positive edges; edges between pairs of negative nodes are labeled negative edges; and edges between pairs of heterogeneous nature nodes are labeled transition edges.

Edges of the keygraph can also be valued using some KID filter response statistics along the path connecting the nodes, for example, minimum, maximum, median, average, etc. An example of a keygraph structure is shown in FIG. 24, with keygraph nodes and edges being shown in FIG. 25.

In FIG. 24, each influence zone of a keypoint is shown by a shaded area. Although there are many areas having the same shading, it will be appreciated that this is for representation only, and, does not mean that areas with the same shading are associated with the same keypoint.

It will readily be appreciated that the representation, in the keygraph, of the influence zones nearer to the imaging system are larger than those further away, that is, the hand is nearer to the imaging system than the rest of the person in the image.

In FIG. 25, the nodes corresponding to maxima and their connected connections are shown in a lighter color than the nodes corresponding to minima and their associated connections. As can be seen from the hand of the person in the image, the fingers, thumb and outer parts of the palm are associated with maxima and the space between fingers and the center of the palm are associated with minima.

The keygraph structure can be advantageously used for tracking purposes, as it adds topological constraints to the tracking problem. It allows, for example, for the rephrasing of the classical keypoint tracking problem as a graph matching problem.

In addition to positional information (x-y plane of the sensor), time-of-flight (ToF) or depth sensing imaging systems provide two data values for each pixel, namely, a phase (which provides an estimate of the distance to the surface sensed by the pixel), and, an amplitude (which approximately corresponds to a portion of infrared radiation emitted by the imaging system which has been reflected back to the sensor). The method described above for the determination of distance-independent keypoints can then be applied to the input depth image itself as illustrated in FIGS. 9 to 15 and 21 to 25 or a by-product of the input depth image, such as, the amplitude image.

By using a depth value for each pixel, the pixel size of features in an image can be dynamically determined in accordance with the depth value of the pixel being processed, and, each pixel can be described as being "a local scale adaptive pixel".

The invention claimed is:

1. A computer-implemented method for determining at least one keypoint in a three-dimensional image of a scene, the method comprising the steps of:
   a) capturing a three-dimensional image of the scene using a depth sensing imaging system;
   b) deriving, using at least one processor, a depth map of the captured three-dimensional image of the scene, each pixel in the captured three-dimensional image having a depth value associated therewith;
   c) applying, using the at least one processor, a distance-independent keypoint filter to the depth map of the captured three-dimensional image to generate a distance-independent keypoint filter response for the captured three-dimensional image, wherein the distance-independent keypoint filter response is independent of a distance from the depth sensing imaging system to objects arranged within the captured three-dimensional image; and
   d) determining, using the at least one processor, at least one keypoint from the generated distance-independent keypoint filter response for the captured three-dimensional image.

2. The computer-implemented method according to claim 1, wherein step c) further comprises generating an image grid for the captured three-dimensional image, each pixel in the image grid having an associated depth value which forms the depth map.

3. The computer-implemented method according to claim 2, wherein the generated distance-independent keypoint filter response comprises a density function corresponding to positions in the image grid.

4. The computer-implemented method according to claim 3, wherein step d) further comprises determining a mean shift field corresponding to a displacement of weighted mean values for each position in the image grid between two iterations.

5. The computer-implemented method according to claim 4, wherein the mean shift field comprises x- and y-components, and wherein step d) further comprises deriving the at least one keypoint from an intersection between 0-isolines of the x- and y-components of the mean shift field for each pixel in the image grid.

6. The computer-implemented method according to claim 5, wherein step d) further comprises determining configuration codes for each of the x- and y-components, and determining if each configuration code is valid.

7. The computer-implemented method according to claim 6, wherein step d) further comprises, if the configuration code for each component is valid, determining an intersection 0-isolines of x- and y-components of the mean shift field for each pixel in the image grid.

8. The computer-implemented method according to claim 7, wherein step d) further comprises, if the configuration codes for each of x- and y-components of the mean shift field is valid, determining if the intersection point falls within a square from which the 0-isolines of the x- and y-components are determined.

9. The computer-implemented method according to claim 1, wherein the generated distance-independent keypoint filter response comprises spatial local maxima and minima response values in accordance with respective positive and negative responses thereof.

10. The computer-implemented method according to claim 9, wherein step d) comprises determining at least one keypoint as being a maximum response value.

11. The computer-implemented method according to claim 9, further comprising extracting local maxima and minima values corresponding to respective positive and negative responses of the distance-independent filter based on a locally adaptive scale.

12. The computer-implemented method according to claim 11, wherein step d) comprises determining the at least one keypoint as being a maximum value in accordance with its local scale.

13. The computer-implemented method according to claim 1, wherein step c) comprises tuning the distance-independent keypoint filter to a characteristic value corresponding to an object within the captured three-dimensional image of the scene.

14. The computer-implemented method according to claim 1, wherein the distance-independent keypoint filter is convolved with the captured three-dimensional image to create a filtered response image.

15. The computer-implemented method according to claim 14, further comprising splitting the filtered response image into a positive response corresponding to maxima and a negative response corresponding to minima.

16. An image processing system comprising:
   at least one processor configured for receiving a captured three-dimensional image of a scene from a three-dimensional imaging system and for performing the steps of:
      deriving a depth map of the captured three-dimensional image of the scene, each pixel in the captured three-dimensional image having a depth value associated therewith;
      applying a distance-independent keypoint filter to the depth map of the captured three-dimensional image to generate a distance-independent keypoint filter response for each captured image, wherein the distance-independent keypoint filter response is independent of a distance from the three-dimensional imaging system to objects arranged within the captured three-dimensional image; and
      determining at least one keypoint from the generated distance-independent keypoint filter response for the captured three-dimensional image.

17. A non-transitory computer-readable data storage medium containing computer-readable instructions, which when loaded on a computerised system, causes the computerised system to perform the computer-implemented method according to claim 1.

18. A gesture recognition system configured for recognizing gestures performed within a frustum of a three-dimensional imaging system including an image processing system according to claim 16.

* * * * *